Oct. 23, 1962 W. BREITLING ETAL 3,059,845

APPARATUS FOR TRANSMISSION AND RECEPTION OF IMPULSES
REPRESENTING NUMERICAL VALUES
AND COMPUTING OPERATIONS

Filed July 8, 1958 11 Sheets-Sheet 1

INVENTORS
Wilhelm Breitling
Hans Heuer
by: Michael S. Striker
Attorney

FIG.2
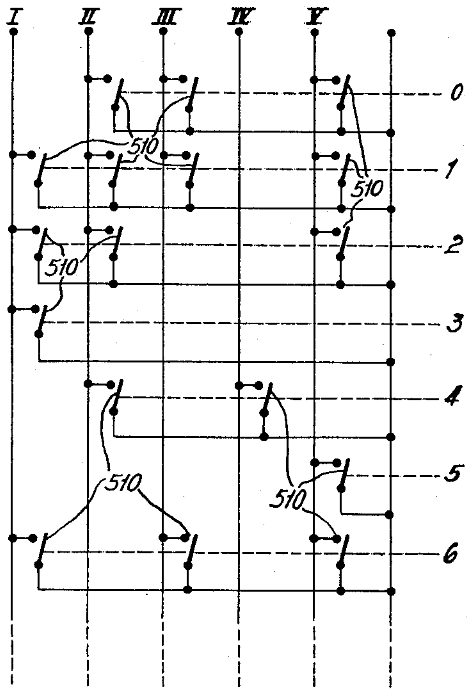
FIG.4
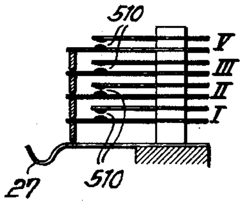
FIG.5
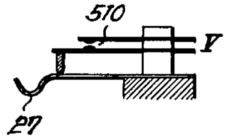
FIG.3
| | I | II | III | IV | V |
|---|---|---|---|---|---|
| 0 | | • | • | | • |
| 1 | • | • | • | | • |
| 2 | • | • | | | • |
| 3 | • | | | | |
| 4 | | • | | • | |
| 5 | | | | | • |
| 6 | • | | • | | • |
| 7 | • | • | • | | |
| 8 | | • | • | | |
| 9 | | | | • | • |
FIG.6
| | I | II | III | IV | V |
|---|---|---|---|---|---|
| + | • | | | | • |
| − | • | • | | | |
| # | • | | • | • | |
| ◊ | | • | | • | • |
| * | | | • | | • |
| L | | | • | | |
INVENTORS
Wilhelm Breitling
Hans Heuer
by:
Michael S. Striker
Attorney Oct. 23, 1962 W. BREITLING ETAL 3,059,845

APPARATUS FOR TRANSMISSION AND RECEPTION OF IMPULSES
REPRESENTING NUMERICAL VALUES
AND COMPUTING OPERATIONS

Filed July 8, 1958 11 Sheets-Sheet 3

INVENTORS
Wilhelm Breitling
Hans Heuer
by:
Michael S. Striker
Attorney

Oct. 23, 1962 W. BREITLING ETAL 3,059,845

APPARATUS FOR TRANSMISSION AND RECEPTION OF IMPULSES
REPRESENTING NUMERICAL VALUES
AND COMPUTING OPERATIONS

Filed July 8, 1958 11 Sheets-Sheet 4

INVENTORS
Wilhelm Breitling
Hans Hauer
by: Michael S. Striker
Attorney

INVENTORS
Wilhelm Breitling
Hans Heuer
by: Michael S. Striker
Attorney

APPARATUS FOR TRANSMISSION AND RECEPTION OF IMPULSES
REPRESENTING NUMERICAL VALUES
AND COMPUTING OPERATIONS

Filed July 8, 1958 11 Sheets-Sheet 6

INVENTORS
Wilhelm Breitling
by:
Michael S. Striker
Attorney

APPARATUS FOR TRANSMISSION AND RECEPTION OF IMPULSES
REPRESENTING NUMERICAL VALUES
AND COMPUTING OPERATIONS

Filed July 8, 1958 11 Sheets-Sheet 7

INVENTORS
Wilhelm Breitling
Hans Herer
by: Michael S. Striker
Attorney

INVENTORS
Wilhelm Breitling
Hans Heuer
by: Michael S. Striker
Attorney

Oct. 23, 1962 W. BREITLING ETAL 3,059,845

APPARATUS FOR TRANSMISSION AND RECEPTION OF IMPULSES REPRESENTING NUMERICAL VALUES AND COMPUTING OPERATIONS

Filed July 8, 1958 11 Sheets-Sheet 9

INVENTORS
Wilhelm Breitling
Hans Heuer
by: Michael S. Striker
Attorney

INVENTORS
Wilhelm Breitling
Hans Heuer
by:
Michael S. Striker
Attorney

INVENTORS
Wilhelm Breitling
Hans Heuer
by:
Michael S. Striker
Attorney

United States Patent Office 3,059,845

Patented Oct. 23, 1962

3,059,845

APPARATUS FOR TRANSMISSION AND RECEPTION OF IMPULSES REPRESENTING NUMERICAL VALUES AND COMPUTING OPERATIONS

Wilhelm Breitling and Hans Heuer, Wilhelmshaven, Germany, assignors to Olympia Werke A.G., Wilhelmshaven, Germany Filed July 8, 1958, Ser. No. 747,267
Claims priority, application Germany July 10, 1957
34 Claims. (Cl. 235—60.4)

The present invention relates to an apparatus for transmission and reception of impulses representing numerical values and computing operations, and more particularly to an apparatus provided in a computing machine for the purpose of transmitting command signals to a remote station so that at the remote station corresponding numerical values are registered and printed, and corresponding computing operations are carried out. Preferably, the apparatus has also means for receiving such signals from a remote station so as to be controlled to register and print numerical values received from a remote station, and to carry out computing operations in accordance with such signals received from a remote station.

Devices according to the prior art which are intended to serve a similar purpose have certain disadvantages, for example an apparatus capable of operating in twelve decimal orders requires 120 output lines, and for receiving and registering signals arriving from a remote station, over 120 electromagnetic devices are required.

It is one object of the present invention to overcome the disadvantages of known apparatus of this type, and to provide a simple and efficient apparatus for the transmission and reception of impulses representing numerical values and computing operations so as to control the printing and computing operations of a computing machine.

Another object of the present invention is the provision of an apparatus of the type described in which impulses representing numerical values and computing operations are transmitted in coded form.

It is also an object of the present invention to operate a punching device for punching a teletype tape by the coded signals, so that teletype apparatus can be controlled from the thus punched tape.

With these objects in view, the present invention mainly consists in a register means including a set of differential elements, each of which is movable in one direction independently of the other elements between a plurality of positions for representing information; a support movable transverse to the differential elements between a plurality of shifted position in which a row of switch means mounted on the support cooperates successively with the differential elements. Each switch means includes a plurality of contacts which are respectively connected to selected groups of a set of output lines so that coded impulses are transmitted through the output lines when the differential elements in positions representing numerical values or computing operations actuate corresponding switch means in the shifted positions of the support.

The differential elements are either controlled from the keyboard and pin carriage of computing machine, or are controlled from a remote station by other input means which respond to coded signals to effect movement of the differential elements to a position representing numerical values and computing operations in accordance with received command signals. It is therefore apparent that in accordance with the present invention a mechanical register including the set of differential elements is provided for registering numerical values and commands regarding printing and computing operations, and that such register can be either controlled from the keyboard of the respective machine, or from coded impulses received from a remote station. On the other hand, the values and operations registered in the register means can be transferred in the form of coded impulses to a remote station for operating the same. Instead of directly controlling the remote station, the coded impulses may be used to control a punching device and the thus punched tape is then used for controlling other stations.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a fragmentary diagram illustrating the connections of coding switches to output lines;

FIG. 3 is a table illustrating the code applied in the diagram of FIG. 2;

FIG. 4 is a side view illustrating a switch means including a number of coding contacts for representing the digit 1;

FIG. 5 is a side view of a switch means with a coding contact representing the digit 5;

FIG. 6 is a table illustrating a code applied for transforming commands regarding computing and printing operations into coded signals;

Figures 7, 7A, 8, 8A:
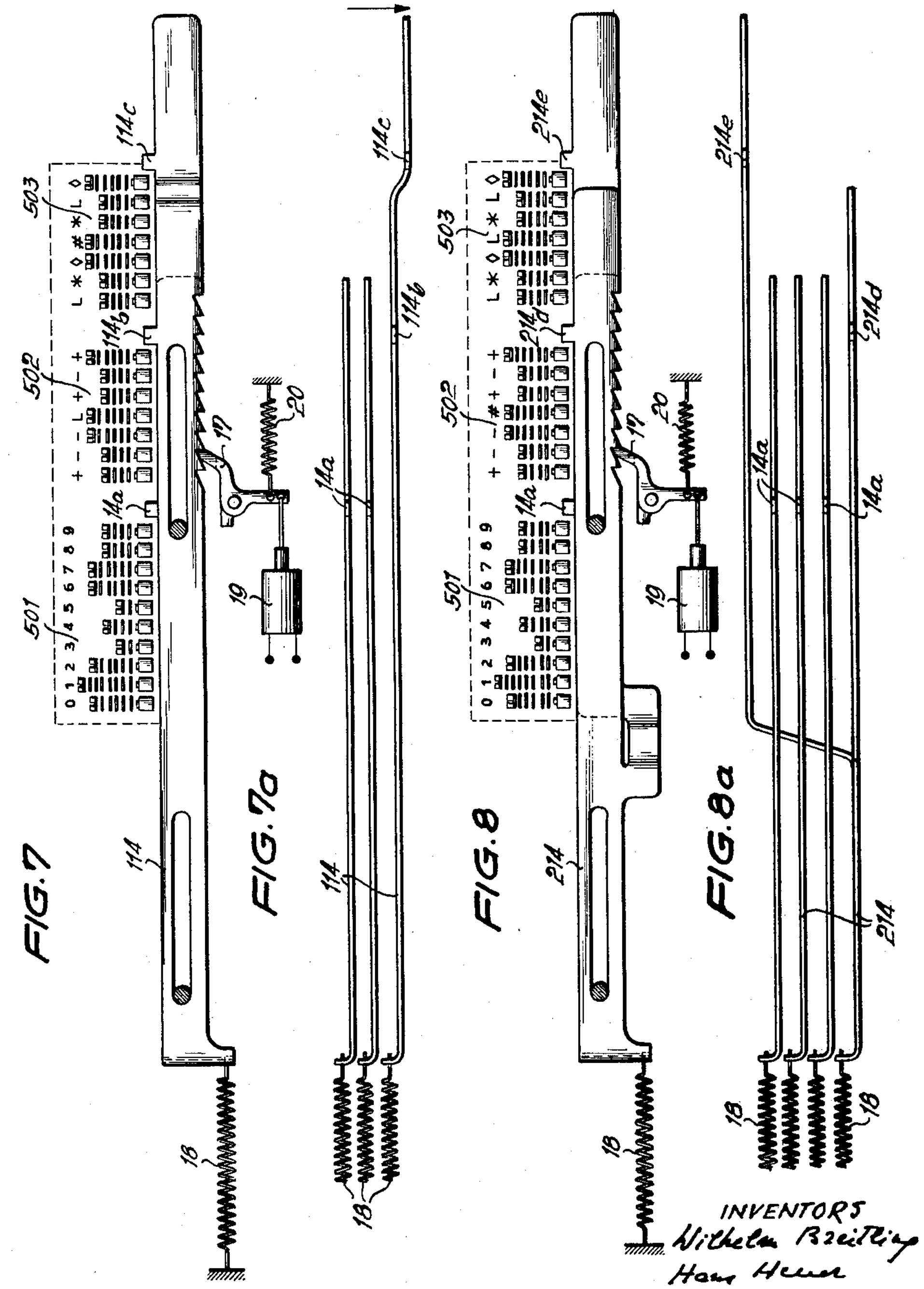
FIG. 7 is a fragmentary side view illustrating in a schematic manner means for transferring registered information.
Figure 8B:
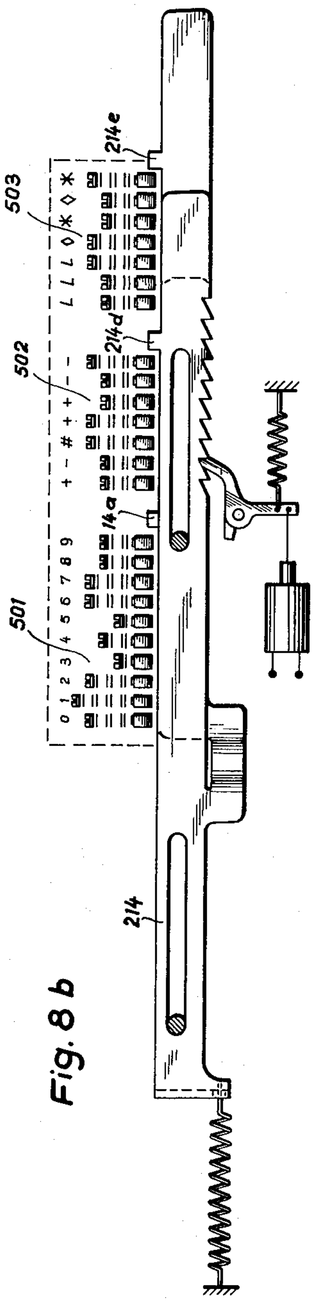
Figure 8C:
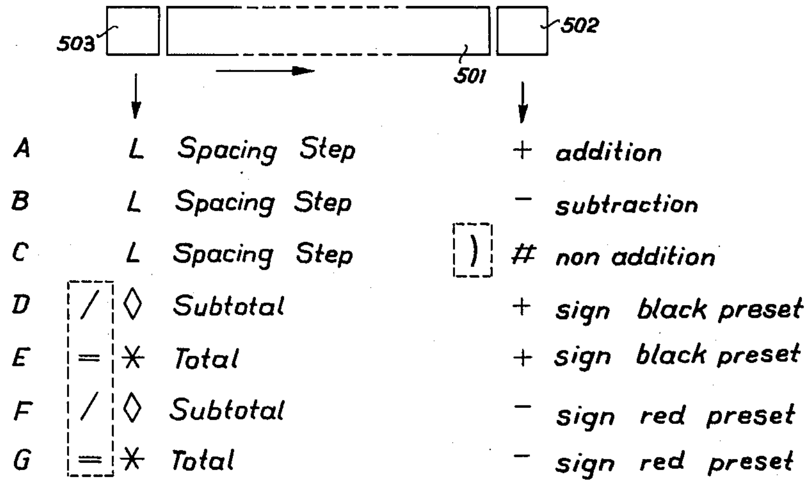
Figure 8D:
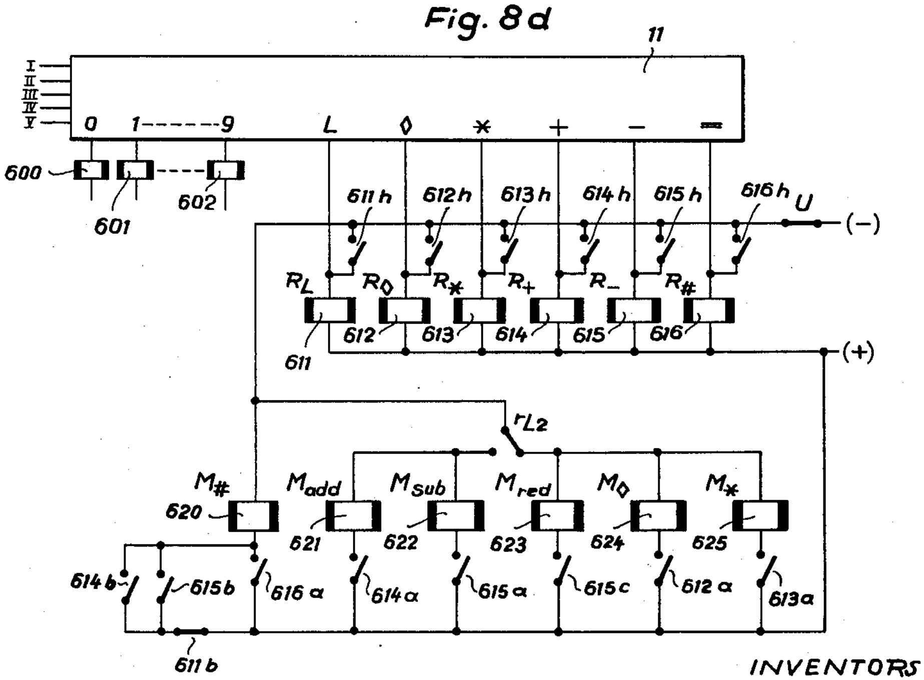
Figures 9, 9A, 10, 11, 12:
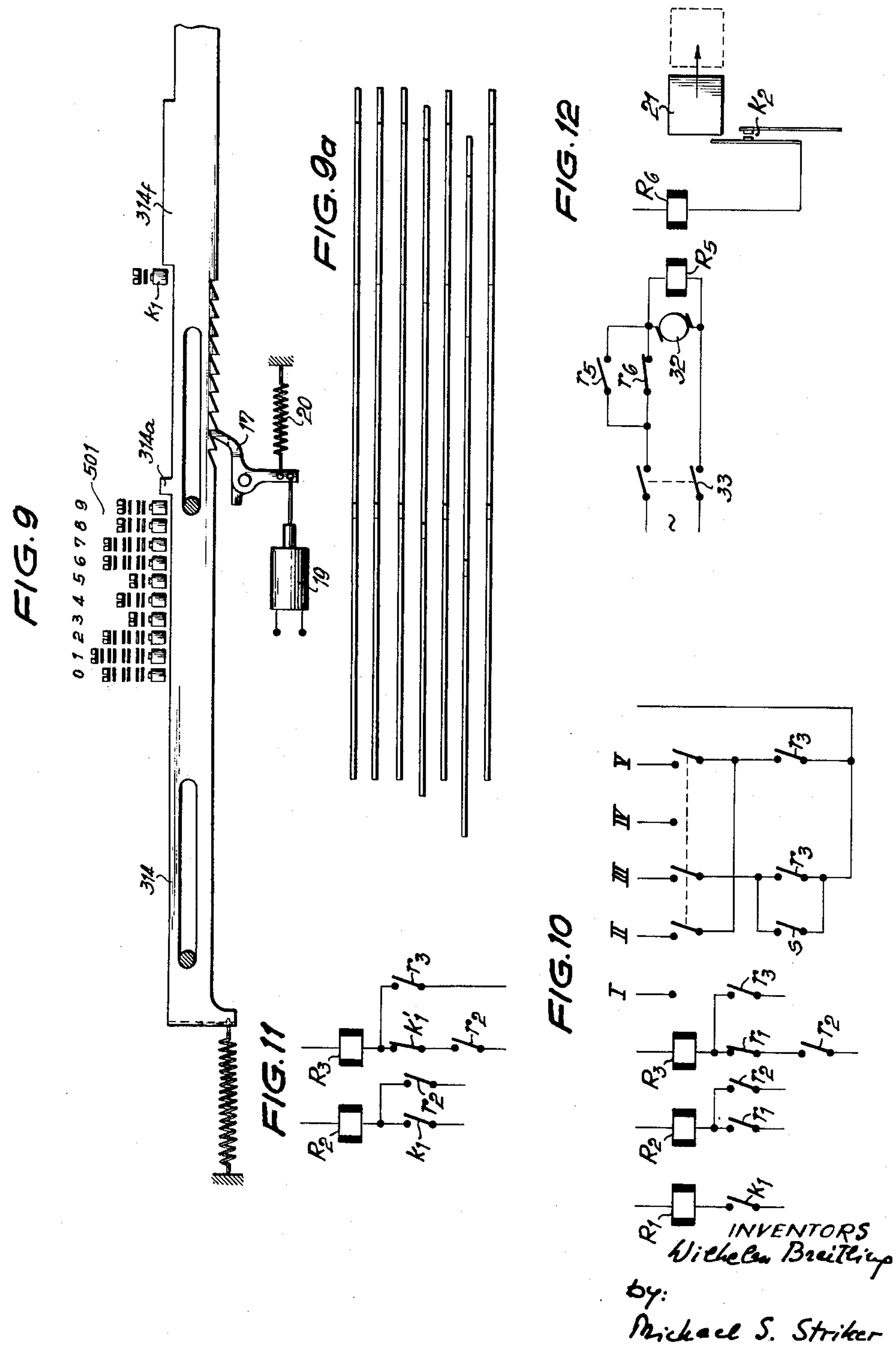
Figures 13, 13A, 19, 20:
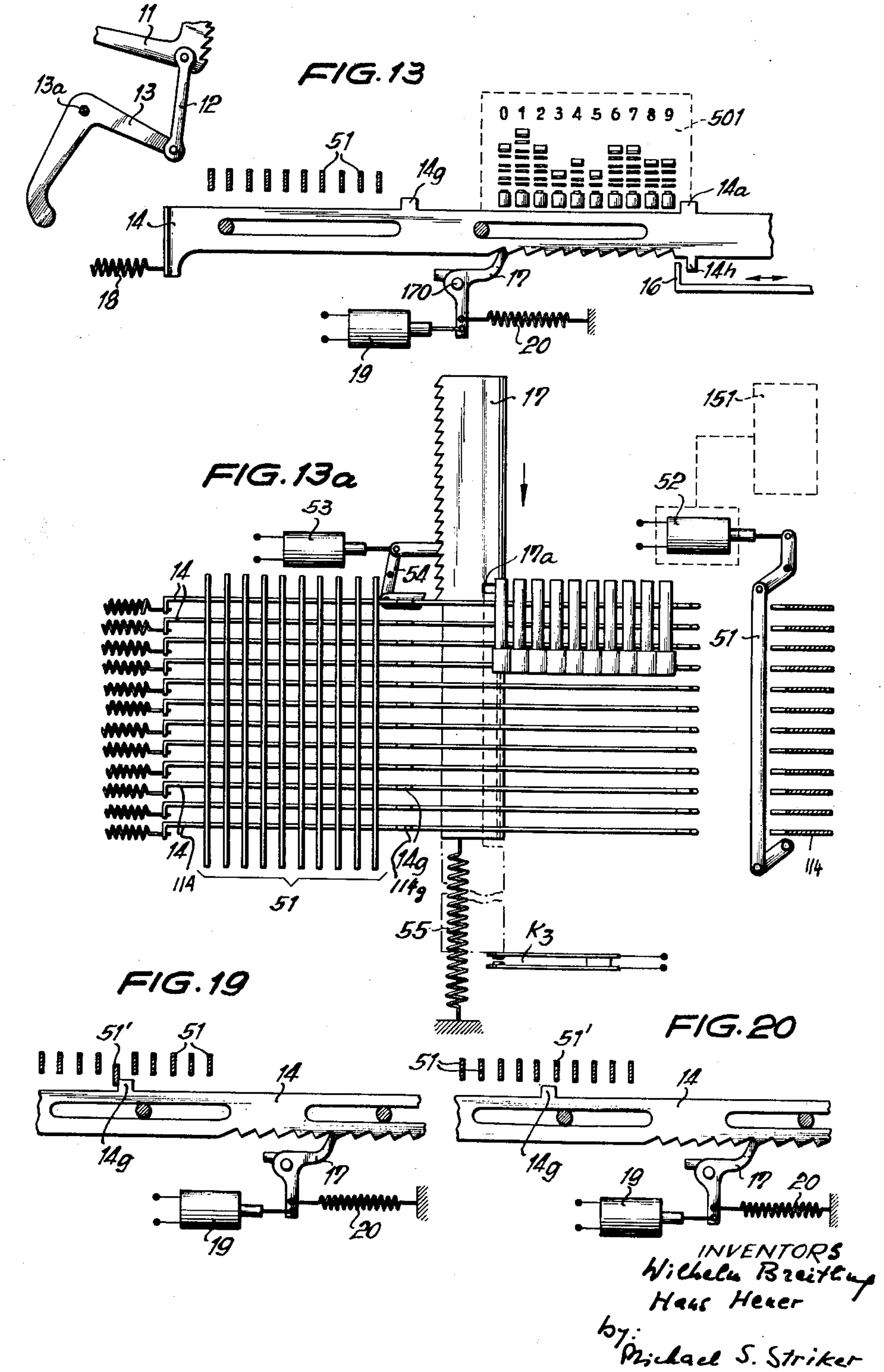
Figure 14:
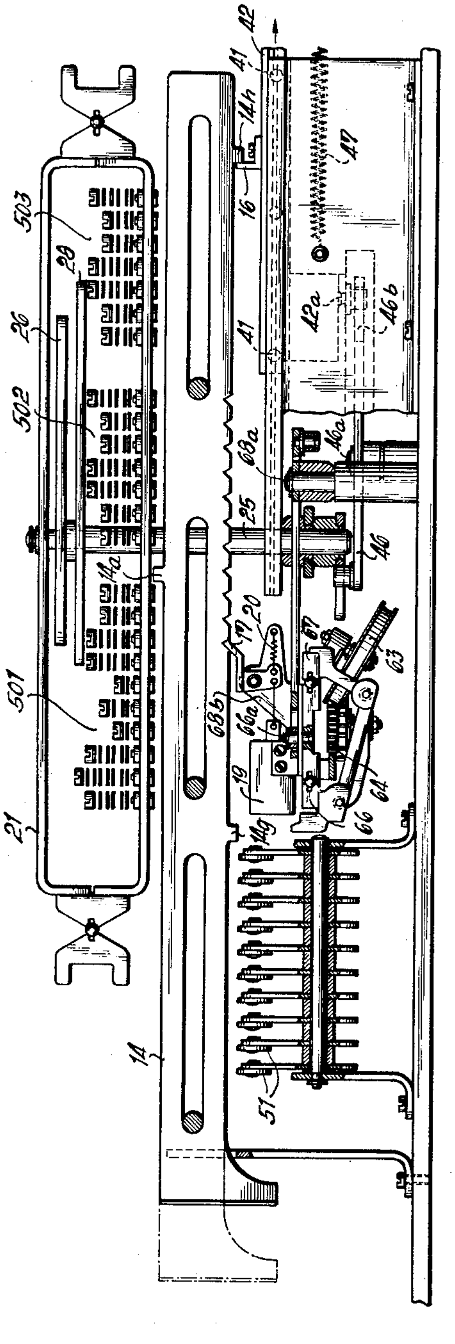
Figure 17:
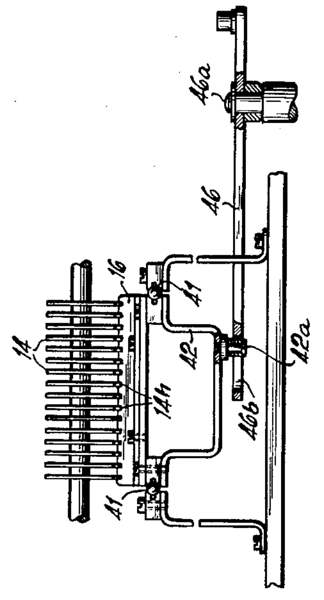
Figure 18:
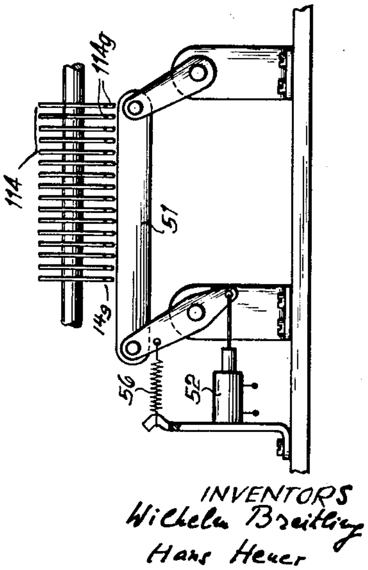
Figure 15:
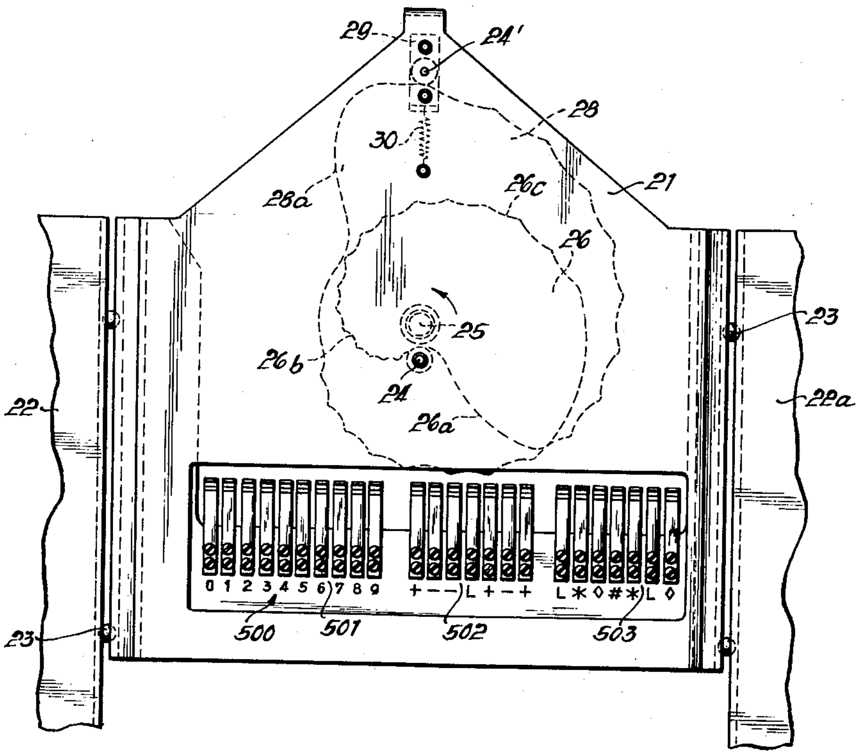
Figure 25:
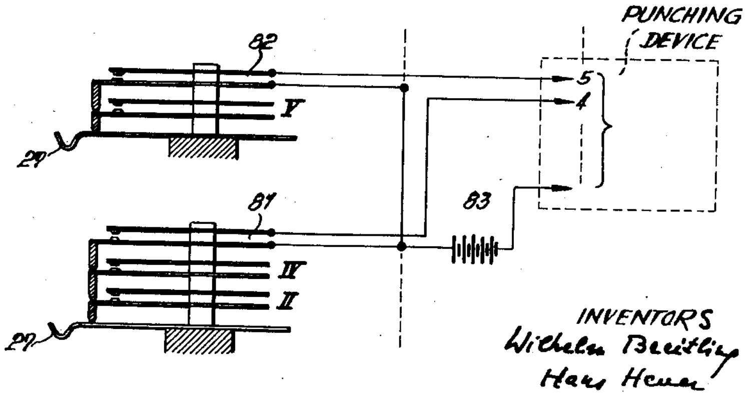
Figures 16, 24, 26:
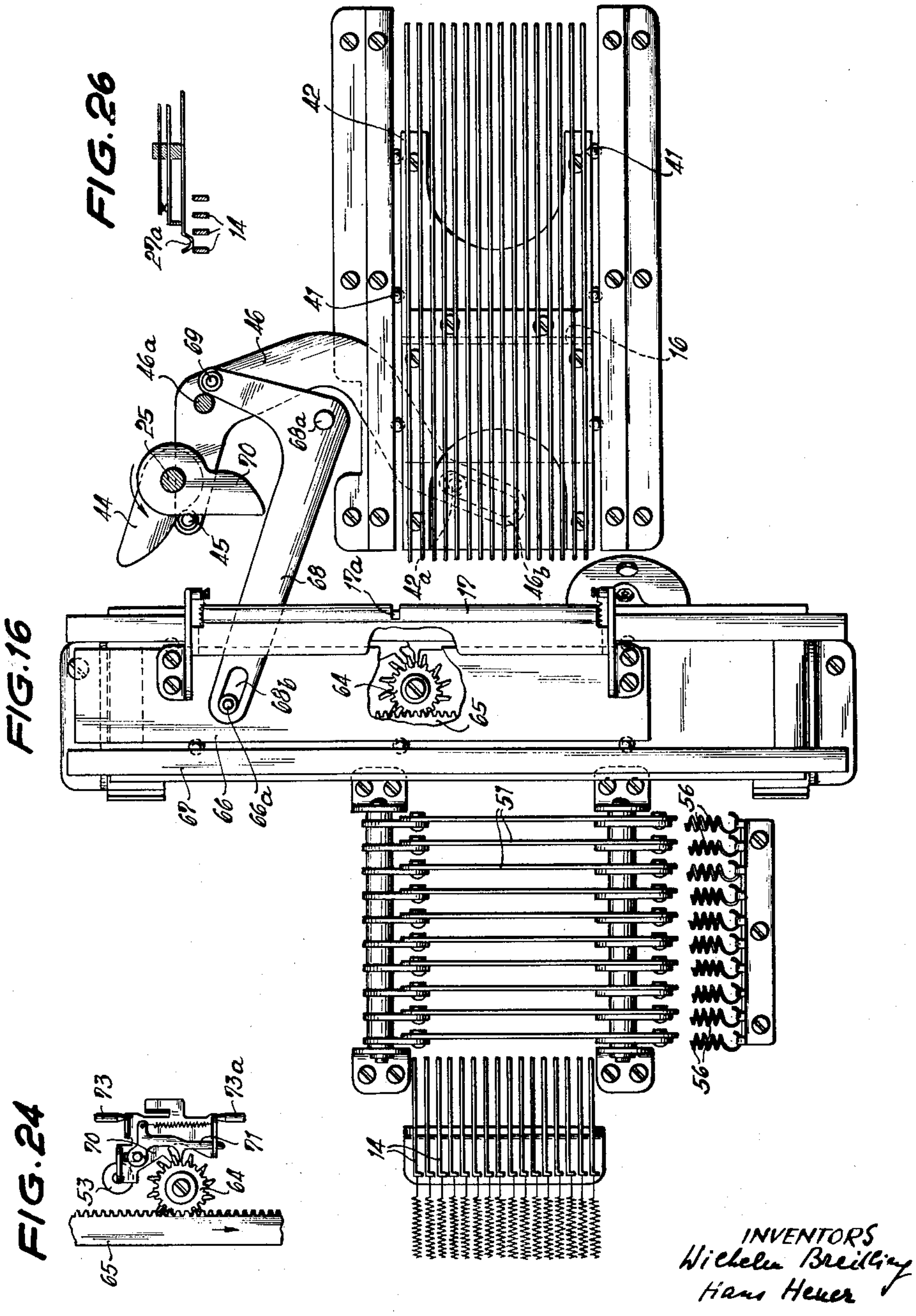
Figure 21:
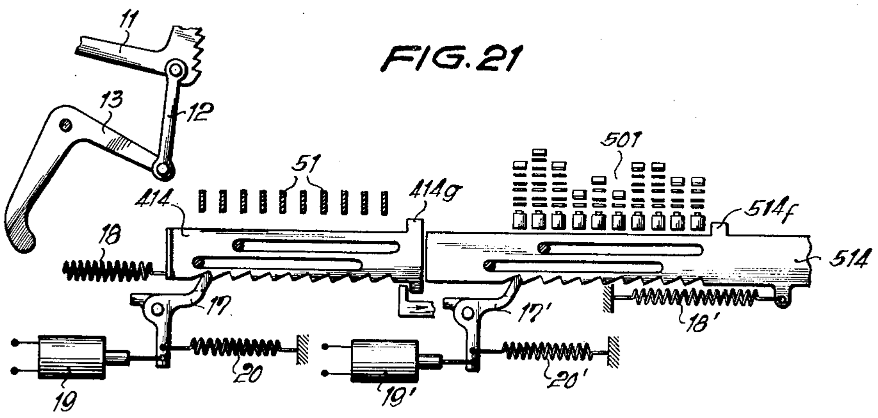
Figure 22:
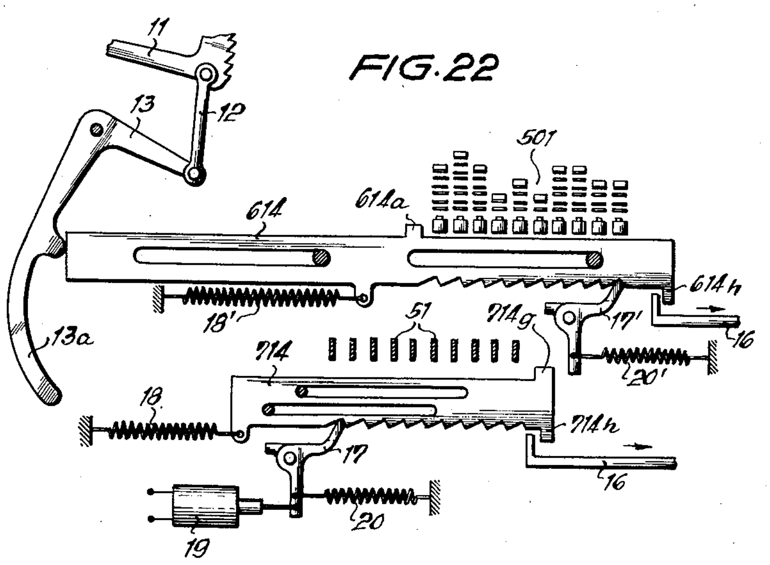
Figure 23:
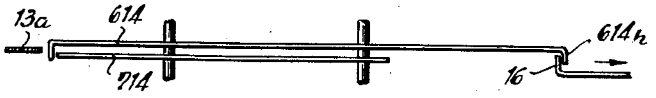

FIG. 7*a* is a fragmentary plan view of FIG. 7;

FIG. 8 is a fragmentary side view illustrating a modified arrangement for the transmission of registered numerical values and computing operations;

FIG. 8*a* is a fragmentary plan view of the device shown in FIG. 8;

FIG. 8*b* is a fragmentary side view corresponding to FIG. 8, but showing a different arrangement of the switch means by which coded impulses representing computing and printing operations are formed;

FIG. 8*c* is a table illustrating the arrangement of the coding switch means by which computing and printing operations are controlled;

FIG. 8*d* is a diagram illustrating the circuit at a receiving station by which coded signals are translated to effect desired computing and printing operations at the receiving computing machine;

FIG. 9 is a fragmentary side view illustrating a modification of the register means for the purpose of preventing printing of zeros above the highest order of a number;

FIG. 9*a* is a fragmentary plan view of the arrangement of FIG. 9;

FIG. 10 is a diagram illustrating a relay arrangement for controlling the transmission of zeros;

FIG. 11 is a diagram illustrating a modified arrangement for the transmission of zeros;

FIG. 12 is a diagram illustrating a relay arrangement for controlling the register means;

FIG. 13 is a fragmentary side view illustrating a register means provided with another input means which is operated from a remote station;

FIG. 13*a* is a fragmentary plan view of the device shown in FIG. 13;

FIG. 14 is a fragmentary side view, partly in section, illustrating a practical embodiment of the present invention;

FIG. 15 is a fragmentary plan view illustrating a carriage supporting the coding switch means;

FIG. 16 is a fragmentary plan view of an embodiment of the present invention illustrating the operating means for the switch supporting carriage and for the return of the register elements to initial normal position;

FIG. 17 is a fragmentary end view illustrating parts of FIG. 26;

FIG. 18 is a fragmentary end view illustrating the arrangement of the remote controlled input means;

FIG. 19 is a fragmentary side view illustrating an operational position of the remote controlled input means;

FIG. 20 is a fragmentary side view illustrating another operational condition of the remote controlled input means and of a register element;

FIG. 21 is a fragmentary side view illustrating a modified construction of a register element according to the present invention;

FIG. 22 is a fragmentary side view illustrating another modified arrangement of the register elements of the present invention;

FIG. 23, is a fragmentary plan view illustrating another modified construction of a register element according to the present invention;

FIG. 24 is a fragmentary plan view illustrating a detail of FIG. 17;

FIG. 25 is a fragmentary schematic side view illustrating coding switch means provided with additional contacts for controlling a punching device; and FIG. 26 is a fragmentary side view illustrating a modified construction of a coding switch means.

Figure 1:
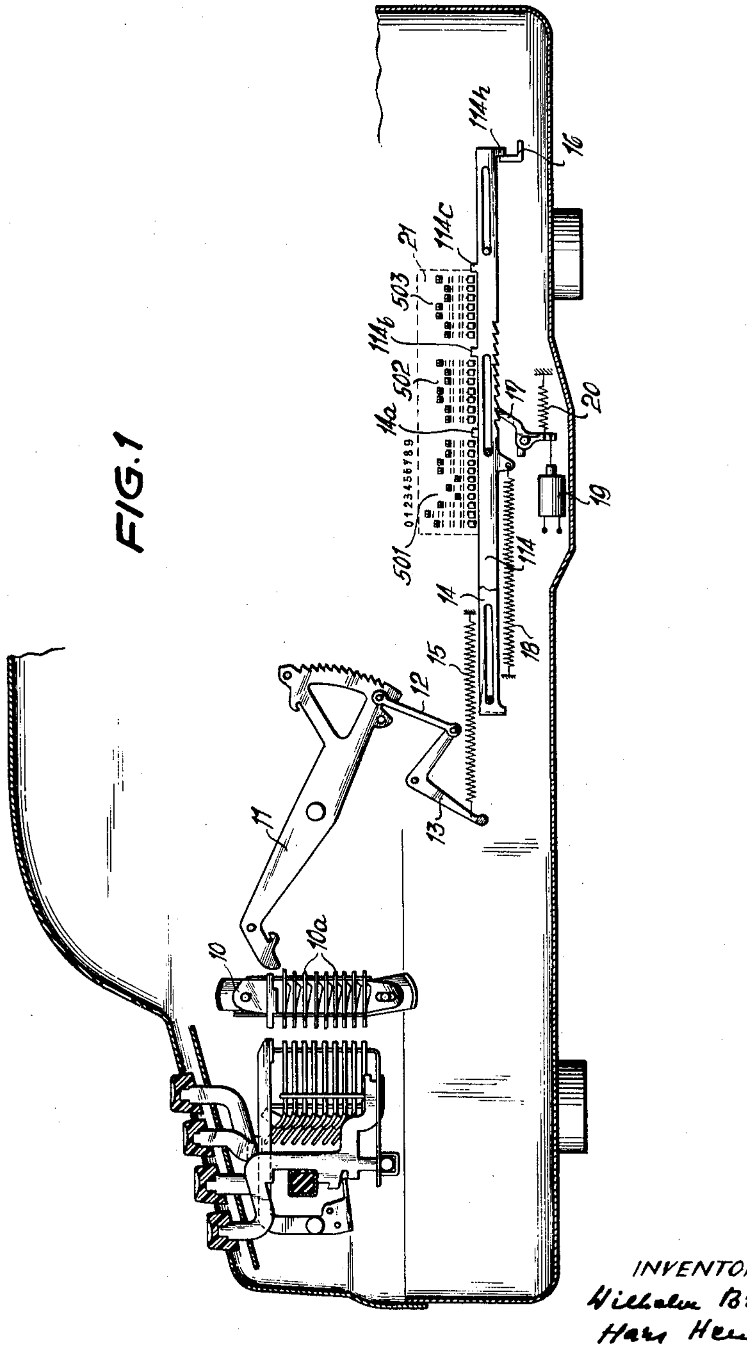
FIG. 1 is a fragmentary longitudinal section of a computing machine provided with the apparatus of the present invention, with known parts omitted for the sake of clarity.

Referring now to the drawings, and more particularly to FIG. 1, a keyboard 100 controls in a known manner a pin carriage 10 to register digits in the orders of a multi-order number. The main levers 11 of the machine assume a position corresponding to the number stored in the pin carriage, and control intermediate levers 12, 13 to assume corresponding positions.

In accordance with the present invention, a set of differential slide elements 14 is provided which are respectively associated with decimal orders, as are the main levers 11. At least one main lever 11 is associated with computing operations, and is controlled by the respective operation keys of the machine, such as the sub-total key, the total key, and the addition- and subtraction keys. This main lever 11 cooperates with a differential register element 114 whose position and shape can be best seen in FIG. 7*a*. Instead of the register element 114, a forked register element 214 can be provided as shown in FIG. 8*a*. Register elements 114 and 214 are consequently not associated with numerical values, but are associated with computing and printing operations.

While in conventional computing machines, the intermediate levers 13 are articulated to the register slides, in accordance with the present invention the register elements are independently movable, and are retracted to an initial position by a bar 16 extending across all register elements and engaging projections **14*h* and 114*h*, respectively. Every time the main levers 11 are returned, the register elements 14 and 114 are retracted to a normal initial position, as will be described hereinafter in greater detail. However, each differential element 14, 114 is urged by spring 18 which is secured to the frame of the machine, to move to the left as viewed in FIG. 1. Moreover, springs 15 connect the intermediate levers with associated differential elements 14, 114 so that the differential elements 14 and 114 will tend to move to a position engaging the respective associated intermediate levers 13, when they are released by the arresting means 17, and by the bar 16. Assuming that levers 11 and 13 are in a position representing a numerical value, and certain computing operations, the register elements 14 and 114 will assume a corresponding position when abutting against intermediate levers 13 under the action of springs 18 and 15. When arrested in this position by arresting means 17, they will remain in such position, registering the respective information, while the levers 11 and 13 may return to their initial position during the operational cycle of the computing machine, since springs 15** permit a relative movement between the elements.

This arrangement of the present invention has the advantage that the main levers 11 to do not have to provide the forces required for shifting the register means 14 and 114.

At the beginning of an operation, all differential register elements are returned by bar 16 to the right in FIG. 1 and into the illustrated position. In this position they are arrested by the arresting catch 17 which is a transverse bar extending across all differential elements. A spring 20 is effective to urge catch lever 17 into engagement with the teeth of the register elements. After the main levers 11 have assumed a position representing a numerical value and computing operations, respectively, the electromagnetic releasing means 19 is energized to move arresting means 17 to a position disengaged from the teeth of the register elements, which is, for example, effected by a switch controlled from the main drive shaft of the computing machine. When arresting means 17 releases the register elements, they move to the left under the action of spring 18 until they are blocked by intermediate levers 13 to assume a position representing the numerical values and the respective computing operation. Thereupon, the electromagnetic releasing means 19 are again de-energized, and arresting means 17 arrest the register elements in the new position so that levers 11 can return to initial position.

In accordance with the present invention, the information registered by the register means 14, 114 is now translated into coded impulses by successively sensing the information registered in each of the register elements 14 and 114. Such information is registered by the displacement of each of the register elements from its initial position.

A support 21, illustrated in FIGS. 14 and 15, to be a carriage, carries a row of switch means which extends in the same direction as the register elements 14. As shown in FIGS. 1, 7, 8, 8*b* and particularly in FIG. 15, the row of switch means 500 includes a set of first switch means 501 which are respectively associated with digits, a first set of second switch means 502 which are associated mainly with computing signs, and a second set of second switch means 503 which are mainly associated with computing operations. However, it may be said that all second switch means 502, 503 are associated with computing operations.

Carriage 21 is moved with switch means 500 across the differential register elements 14, 114, between two sensing operations of main levers 11 so that the row of switch means 500 is consecutively located above each of the register slides 14 and 114, or 214 in the arrangement of FIGS. 8, 8*a*, and 8*b*. As shown, for example, in FIGS. 7 and 8, each of the register elements 14 has a projection **14*a*, while the register elements 114 and 214 which are associated with computing operations have two projections 114*b*, 114*c*, and 214*e*, 214*d*, respectively. In the initial position shown in the drawing, the projections are ineffective, since they are not located in the path of movement of the switch means 500. When the register elements are shifted to a position representing the information, the projections are located in the path of corresponding switch means 500 so that the respective switch means are actuated by the respective projections. Each switch means includes a set of contacts which are closed when a spring 27 is engaged by a projection on one of the register elements. The construction of the switch means is best seen in FIGS. 4, 5 and 26. FIGS. 4 and 5 show an arrangement in which the carriage 21 with the switch means 500 moves step by step so that each projection actuates the respective switch means through spring 27 for a sufficient time while the carriage stops. If a longer portion 27***a* is provided on the switch means, as shown in FIG. 26, the carriage may be moved in a continuous movement since the projections actuate the respective switch means as long as they are in engagement with a portion 27*a* and during time period corresponding to the length of portion 27*a*.

Five output lines I, II, III, IV and V are preferably provided as shown in FIG. 2 which shows the connections between the switch means associated with the digits zero and six to the output lines. Each contact 510 in FIG. 2 corresponds to a contact 510 in FIG. 4. For example, the switch means 501 associated with the digit 1 has four contacts 510 as shown in FIG. 4, and the switch means associated with the digit 5 has one contact 510 as shown in FIG. 5. FIG. 3 shows all combinations for the switch means associated with the digits from zero to nine. It will be understood that by actuation of anyone of the switch means 501, a corresponding group of output lines will transfer a coded group of impulses, which can be evaluated at a remote station.

The second switch means 502 and 503 are constructed in the same manner as the switch 501 and include a plurality of contacts which are connected to the output lines. Seven switch means 502, seven switch means 503, and ten switch means 501 are provided. Therefore, catch 17 need not be located in the first notch of element 114 in the initial position shown in FIG. 7, while the first notch of each elements 14 is engaged by catch 17. FIG. 6 shows a code used to produce coded impulses in the output lines to represent computing operations. The first line in FIG. 6 represents "addition" or a plus sign, the second line represents "subtraction" or a minus sign, the third line represents "non-addition," the fourth line represents "sub-total," the fifth line represents "total," and the last line represents a spacing step which effects in a teletype machine the provision of a space. As explained above, the differential register element 114 can be controlled by a main lever 12 to assume a position for actuating the respective second switch means 502, 503, or may be controlled directly from the operating key of the machine.

As shown in FIG. 7, the register element 114 is arranged forwardly in direction of movement of the carriage which is indicated by an arrow in FIG. 7*a*. Consequently, assuming that the register elements 14 and 114 were shifted to represent information, the respective switch means 501 will be consecutively actuated by the projections 14*a* of all the register slides 14 of which only two are shown in FIG. 7*a*. Thereupon, the carriage will move to a position in which the switch means 502 are located above the register element 114, and a selected switch means 502 will be actuated by projection 114*b*. When the carriage 21 moves further to the next shifted position, a second switch means 503 will be actuated by the projection 114*c*, since the portion of register element 114 carrying projection 114*c* is offset with respect to the portion carrying projection 114*b*. It will be noted that the distance between projections 114*b* and 114*c* is constant in all shifted positions of the register element 114 so that a pair of associated second switch means 502 and 503 is always actuated. The function of the switch means 502 and 503 is indicated in FIGS. 7, 8 and 8*b*. In the arrangement of FIG. 7, a sub-total is associated with a plus, a spacing step L is associated with a minus, a total is associated with a plus, a non-addition is associated with a spacing step, a sub-total is associated with a minus, a total is associated with a minus, and a spacing step is associated with a plus. Consequently, different combinations between the signs and the computing operations can be established by correspondingly setting the register element 114. For example, a sub-total and a plus is transmitted in the first shifted position of element 114, and a sub-total and a minus is transmitted in the fifth operative position of register element 114.

The following example of an operation is illustrative: A negative total of balance is to be transmitted from the accumulator of the transmitting machine to a punching device, and from the punch tape to a remote receiving station in the form of a sub-total or total. In this event, the total key of the transmitting machine is operated. When the operational cycle is started, main levers 12 move to a position representing the respective number, and main lever 12 for operations assumes a position representing "total" and a minus sign. The register element 114 is thus stopped by the respective operation lever 12 in a position which is spaced 6 steps to the left in FIG. 7 from the initial position illustrated in the drawing. In this position, projection 114*c* is aligned with a switch means 503 representing a total, and projection 114*b* is aligned with a switch means 502 representing the minus sign. If the total would have been positive, the register element 114 would have to move only three steps in which a switch means 503 associated with total is paired with a switch means 502 representing a plus.

The registered numerical value and operations are sensed by moving the carriage 21 with the row of contacts 500 across the register slides 14 and 114. The number of displaced register slides 14 will correspond to the number of orders of the respective number. One of the digit switch means 501 will be actuated in each position of the carriage 21 in which the row of switch means 500 is located above the element 14 associated with the respective order. After coded signals have been transferred representing the number, projection 114*b* is operative to actuate the respective switch means 502, and thereupon projection 114*c* becomes operative to actuate the respective switch means 503. The receiving station first receives the signals representing the numerical values, and the corresponding slides in the receiving machine are set to represent "minus" and total when the coded impulses arrive from switch means 502 and 503. At the same time the main operation lever is released, and the accumulator disconnected. In the following operation of the machine, the total is printed.

In the event that a command for carrying out an addition is to be transmitted, the numerical value is introduced by operation of the keyboard of the transmitting machine, whereupon the "addition" key is operated. This effects settling of the slide elements 14 to express the respective numerical value, while the slide element 114 is permitted to move seven steps to the left to a position in which the projections 114*b* and 114*c* are located opposite the seventh switch means from the right. When the carriage 21 moves across the register elements, at first the numerical value is transmitted, whereupon the projection 114*b* actuates the switch means 502 representing plus. In the next shifted position of the carriage 21, projection 114*c* actuates a switch means 503 associated with a spacing step. The two control signals plus and spacing step effect in the receiving station an operation in which the respective number is added in the totalizer, and printed.

A somewhat different arrangement operating on the same principle is illustrated in FIGS. 8 and 8*a*. In this embodiment, the register element 214 which is associated with operations, is forked, and has one portion located rearwardly of the register elements 14, and another portion located forwardly of the register elements 14. Consequently, the projection 214*e* becomes effective first, and the projection 214*d* becomes effective last. This arrangement serves for controlling the commands given by the transmitting machine to the receiving machine. For example, if a negative balance stored in the accumulator of the transmitting machine is to be transferred as a subtotal to the receiving machine and to be printed, the embodiment of FIGS. 8 and 8*a* effects a checking of the number stored in the accumulator of the receiving machine. In this operation the sub-total key is operated in the transmitting machine so that the main lever 12 for computing operations permits displacement of register element 214 for computing operations five steps to the left in FIGS. 8 and 8*a*.

When carriage 21 moves with the row of switch means 500 across the register elements, projection 214*e* is first effective to actuate a switch means 503 associated with the sub-total. Consequently, the receiving machine senses the command "sub-total" in the punched tape. This effects printing of the sub-total in the receiving machine under control of the accumulator of the receiving machine in negative form.

Thereupon, the numerical value stored in the register means 14 of the transmitting machine is transmitted to the receiving machine. When the number has been transferred, the projection 214*d* becomes effective to actuate switch means 502 associated with minus, and effects printing of the numerical value transmitted from the accumulator of the transmitting machine in the receiving machine, without introducing such numerical value into the accumulator of the receiving machine. Consequently, on the paper roll of the receiving machine appear two sub-totals which should be identical, although one of the sub-total was printed under control of the receiving machine, and the other sub-total was printed under control of the transmitting machine. This arrangement permits a simple control of the transmitted and stored numerical values.

When numbers and computing and printing functions are transmitted by the apparatus of the present invention from a computing machine to a teletypewriter, it is necessary to provide that spacing steps are made by the teletypewriter in each line. For example, a spacing step is required if a transmitted numerical value is not to be added. Such a numerical value may be a number indicating a certain article. As shown in FIG. 7, one of the switch means 502 is designated by character L which indicates a spacing step. This switch means 502 is paired with a switch means 503 which represents "non-addition." The teletyping machine is provided with types for printing the conventional symbols for non-addition, sub-total, and total, and will first make a spacing step after such a descriptive number, and thereupon print the respective symbol.

In a similar manner, numerical values are added without forming a total or sub-total. As shown in FIG. 7, two switch means 503 designated by character L are provided which are respectively paired with switch means 502 associated with plus and minus. The respective transmitted coded impulses effect addition or subtraction in the receiving machine, whereupon the machine carries out an idle step.

In the arrangement of FIGS. 8 and 8*a*, three switch means 503, designated by reference character L, effect idle steps and are paired with three switch means 502 associated with plus, minus and non-addition. Consequently, a punching device controlled by the coded output signals of the transmitting machine may punch a hole in the tape after each hole representing a plus, minus or non-addition, and the receiving machine will be correspondingly controlled. It will be understood that the arrangement of FIG. 7 may be modified in a manner similar to the arrangement of FIG. 8 which would require a switch means 502 representing non-addition, and a switch means 503 representing a spacing step instead of non-addition.

In the arrangement of FIGS. 8 and 8*a*, a tape punched under control of the transmitting machine with a hole representing "total" or "sub-total" is interpreted by the receiving machine and commands an operation. The receiving machine carries out an addition or subtraction, whereupon the transmitted sum or difference, is read out for checking purposes, and printed without a calculating operation. The switch means 502 must transfer a signal for "non-addition," but a differentiation between a positive or negative sum is not possible, and the sum arrived at the transmitting machine can be compared with the sum printed in the receiving machine only as regards the numerical value, while the correct transmission of a positive or negative value cannot be checked.

In accordance with the present invention a register means as described above is also provided in the receiving machine. The symbol for "total" or "sub-total" is printed before the number, and the plus or minus sign behind the number. As compared with the previously described transmission to a receiving calculating machine, in this event the last transmitted signal must represent a printing operation for printing a plus sign or a minus sign.

In the above described arrangement it must be predetermined whether the tape punched under the control of the transmitting machine is later on to be used for controlling a teletypewriter, or another computing machine. Moreover, distinguishable punched tapes must be provided to avoid a wrong interpretation, for example, tapes in different colors.

To overcome this disadvantage, in accordance with the present invention a relay arrangement is provided in receiving machines which automatically effect the actuation of all operational elements in the correct sequence for obtaining the desired computing and printing operation in the correct sequence.

This arrangement will now be described with reference to FIGS. 8*a* to 8*d*, and it should be noted that FIG. 8*a* is a plan view of the arrangement of FIG. 8*b* as well as of the arrangement of FIG. 8.

A comparison between FIGS. 8 and 8*b* will prove that the switch means 502 and 503 are associated with different functions of the machine. As explained above, each of the switch means 502 and 503 includes a plurality of contact means which are connected to the output lines in accordance with a selected code.

FIG. 8*c* illustrates the seven possible pairs of commands A, B, C, D, E, F, and G. It will be noted that the sequence of thet symbols shown in FIG. 8*c* correspond to the sequence of the switch means 503 and 502 in FIG. 8*b*. In this arrangement, a distinction is made between plus and minus signs representing an addition for subtraction, and between plus and minus signs which are intended to produce printing of corresponding signs. Moreover, it is desired that negative numerical values are printed in red.

In positions A and B, a spacing command L, paired with a plus or minus command constitutes a command for addition or subtraction, respectively. If, however, as shown in positions D to G, the first signal transmitted by switch means 503 under control of projection 214*d* refer to sub-total or total, then the following commands from switch means 502 under control of projection 214*e* are interpreted as commands to print a plus or minus sign, respectively. Simultaneously, a command to print in black or red color is given.

FIG. 8*d* shows the diagram of the arrangement for obtaining the above-described control operations. A decoding device 11 receives the coded signals from input lines I to V, and translates the signals in a known manner into impulses representing the digits from zero to nine, and into impulses representing computing and printing operations as indicated by the symbols for idle step, sub-total, total, plus and addition, minus and subtraction, and non-addition.

Ten receiving relays 600–609 are connected to the outputs 0–9 of the translator 11, and are respectively connected to associated electromagnetic means by which corresponding digit values are introduced into the receiving machine.

The six outputs 711 are respectively connected to relays 611–616 which are also designated by reference characters R with a subscript indicating the function of the respective relay. Each relay 611–616 is provided with an associated holding switch 611h–616h, respectively, and are consequently held in energized condition.

Relays 611–616 control electromagnetic operating means 620–625 through relay contacts which are designated by the same reference numerals as the respective relays 611–616 provided with a subscript. Electromagnetic means 620–625 are respectively associated with non-addition, addition, subtraction, printing in red, sub-total, and total as also indicated by the reference character M with the respective symbol. Upon actuation of the respective electromagnetic means 620–625, the respective operation is carried out in the machine. Determination whether printing of a sign, or a computing operation has to be carried out, is accomplished by the combination of the respective signal with an idle step, as explained above with reference to FIG. 8c.

The operations effected in the seven different positions A to G of the register element 214 in FIG. 8a will now be described.

(A) ADDITION

A positive value is introduced. At the output L of device 11 appears a signal before the transmission of the numerical value, and at the output plus appears a signal after the numerical value has been transmitted. Relay 611 is energized and holds itself by contact 611h while preparing the circuit for the electromagnetic means 621 and 622 by contact 611a. At the same time, the normally closed contact 611b opens and interrupts the circuit of contacts 614b and 615b. The number is received by relays 600–609, and the respective electromagnetic actuating means are operated. Relay 614 is energized, and connects electromagnetic means 621 through contact 614a. Electromagnetic means 621 operates the computing machine to carry out an addition.

(B) SUBTRACTION

A negative value is introduced. The outputs 711 L and 711 minus supply command signals. Electromagnetic means 622 is actuated through relay 615 and contact 615a, and electromagnetic means 622 effects the subtraction operation in the machine.

(C) NON-ADDITION

The outputs 711 associated with idle step and non-addition supply signals. Relay 611 is energized, without effecting any operations. After transmission of the respective numerical values through relays 600–609, contact 616a connects electromagnetic means 620 which operates the machine to perform a non-addition operation.

(D) POSITIVE SUB-TOTAL

Outputs 711 associated with sub-total and plus supply signals, and relay 612 attracts, and holds itself by contact 612h. Contact 612a closes and connects electromagnetic means 624 which effects in the receiving machine forming of a sub-total of the numbers stored therein. After termination of the operation, the sub-total computed in the transmitting machine is transmitted. If such sub-total is positive, a signal appears at output 711 plus of device 11, which energizes relay 614 so that contact 614b closes, and connects electromagnetic means 620 through the closed contact 611b whereby printing of the transmitted sub-total is effected without addition.

(F) NEGATIVE SUB-TOTAL

Device 11 supplies signals at the outputs 711 associated with sub-total and with minus. Relay 615 is energized, and contact 615b connects electromagnetic means 620, while contact 615c connects electromagnetic means 623 which effects printing in red color by raising the typewriter ribbon. Consequently, the negative sub-total is printed in red.

(E AND G) TOTAL

At output 711 associated with the total appears a signal which energizes relay 613 so that electromagnetic means 625 is connected by contact 613a. The plus and minus signs are printed, and negative totals are printed in red, as described above with reference to the sub-total.

An interrupting contact U is provided which disconnects the respective relays and electromagnetic means after the operation has been pre-set at the start of the machine operation. Switch U is opened in a known manner by a cam on the machine shaft.

For transmitting the decimal point of a decimal number, a projection or lug corresponding to the projections 214d and 214e can be arranged betwene the register elements 14 shiftable between an operative and inoperative position. If a signal representing a decimal point is then transmitted by a corresponding switch means 500, the teletype machine will print the decimal point at the proper place. A computing machine, however, will not react to such a signal because there is no receiving element provided for this purpose.

In the above described arrangement, it has been assumed that the three available free code combinations of the teletype code are used to operate types with symbols for sub-total, total, and non-addition.

Such special arrangement can be avoided, and the standard types of the teletype machines can be used, if the symbols "diagonal" is used as a symbol for subtotal, the symbol "equal" is used for total, and the symbol "parenthesis" is used for non-addition, as shown in FIG. 8c.

In the constructions shown in FIGS. 7 and 8, all zero values introduced into the register means by the main levers 12 of the computing machine, will be transmitted, and printed in the receiving station. However, it is not desired to print zeros above the highest order of a transmitted numerical value, since this would place an undesired load on the transmitting means. In accordance with the present invention, transmission of impulses representing zeros above the highest order of the number is prevented, so that, for example, the punching device of the tape is not actuated or registers a spacing step.

FIG. 9 shows an arrangement for this purpose with register slide elements 314 which correspond to the register elements 14 in the above described embodiments. The projection 314a corresponds to the projection 14a, and actuates the switch means 502, as described above. Each register element 314 has an elongated projection 314f which cooperates with a zero switch $k_1$ located on the carriage 21. In the initial position of register element 314, projection 314f is located in the position illustrated in FIG. 9. In positions of the register elements 314 in which the projection 314a is located in the path of the switch means 501 associated with the digits from 1 to 9, the projection 314f is located in the path of the zero switch $k_1$. In the last position in which the projection 314a actuates the switch means 501 associated with zero, projection 314f has moved so far to the left that during movement of the carriage 21, zero switch $k_1$ passes projection 314f without engaging the same. Consequently, zero switch $k_1$ is not actuated while the carriage 21 with switch means 501 passes over the register elements 314 representing zeros above the highest order of the respective number. When the carriage arrives in a position in which the switch means 501 are located over the register means associated with the highest order of the number, and consequently representing a digit, not only projection 314a will engage one of the switch means 501 associated with the digits from 1–9 but also projection 314f will engage zero switch $k_1$ and actuate the same.

As best seen from the diagram of FIG. 10, closing of zero switch $k_1$ effects energizing of relay $R_1$ which effects through its contact $r_1$ connection of the relay $R_2$ which holds itself by contact $r_2$. Moreover, the circuit of relay $R_3$ is prepared by closing of the second contact $r_2$ of relay $R_2$, while the normally closed second contact $r_1$ of relay $R_1$ is opened. Consequently, relay $R_3$ is energized when carriage 21 has passed the first register element 314 expressing an integer so that switch $k_1$ opens, and relay $R_1$ is de-energized. Relay $R_3$ closes with contacts $r_3$ the circuit for the switch means 501 associated with zero. Engagement of one of these switch means by projection 314*a* will result in the transmission of a coded signal representing zero to the punching device of the tape. Since relay $R_3$ holds itself, this is also the case for all zeros in the lower orders of the number.

When switch S in FIG. 10 is closed, which is for example the case when values are transmitted to a teletype machine, contact $r_3$ is shunted so that in all preceding positions as shown in FIG. 6, an impulse representing a spacing step is transmitted to the punching device even if the carriage 21 has not yet reached the position associated with the highest order of the respective numerical value.

In the modified circuit shown in FIG. 11, the relay $R_1$ may be omitted, since the zero switch $k_1$ is combined with a normally closed contact $k_1'$. When the zero switch $k_1$ is actuated by a register element 314*f*, contact $k_1'$ opens, and relay $R_2$ is energized through switch $k_1$ so that it holds itself through contact $r_2$ and prepares the circuit of relay $R_3$. When the row of switch means 500 on carriage 21 has passed the register element 314 associated with the highest order of a number, contact $k_1'$ closes again, and connects relay $R_3$, which holds itself.

When it is desired to control a teletype machine by a punched tape, it is necessary to provide in the punched tape perforations representing commands for the carriage return and the line shifting of the teletype machine. For this purpose, further switch means 500, not shown, are provided on the carriage 21 which at the end of the movement of carriage 21 are engaged by corresponding projections on slides, not shown, which correspond in shape to the slides 14, but are manually shiftable to operative position, when control of the teletype machine for line shifting and carriage return operations is desired.

The carriage 21 on which the row of switch means 500 is mounted, is only schematically shown in FIGS. 7, 8 and 9. The actual construction of the carriage 21 is best seen in FIGS. 14 and 15. Carriage 21 is mounted for movement in transverse direction relative to the register slides 14 on a pair of rails 22 and 22*a* which are secured to the frame of the machine. Balls 23 run in grooves of rails 22 and 22*a* and of the carriage frame to assure smooth movement of the cariage 21. The arrangement of the switch means 500 shown in FIG. 15 corresponds to the arrangement described with reference to FIG. 7. At the center of the carriage, a roller 24 is turnable mounted which engages the cam track of a cam 26 which is secured to the drive shaft 25 and rotated by the same in timed relationship with the cycle of operation of the machine. When cam 26 turns in direction of the arrow in FIG. 15, carriage 21 is forwardly moved while cam follower 24 moves along the cam track portion 26*b*. Cam 26 has a second cam track portion 26*c* concentric to the axis of rotation so that carriage 21 remains for a predetermined time in each shifted position after having been shifted by the cam track portion 26*a*. In this manner, the time of actuation of switch means 500 by the projections 14*a*, 114*b*, and so forth, is determined. As previously mentioned, it is also possible to continuously move the carriage by a correspondingly shaped cam, and in this event, the switch means 500 are constructed as shown in FIG. 26 in which the actuation time period is determined by the transverse length of the engaging portion of spring 27*a*.

A return spring may be provided for retracting carriage 21 after roller 24 has passed over the highest point of cam 26. However, it is preferred to provide a second return cam 28, since a better controlled movement, and reduction of the noise can be obtained in this manner.

It would be possible to fixedly mount the second cam follower roller 24' on the carriage, but it is preferred to mount the cam follower roller 24' on a movable support 29 which is mounted on carriage 21 and is urged by a spring 30 to move into a position in which roller 24' engages the cam track of cam 28. Slight deviations from the theoretical shape of cams 26 and 28 are thereby compensated so that there is no play in the arrangement. Cam track portion 28*a* of cam 28 returns carriage 21 while roller 24 moves along cam track portion 26*a*.

As previously explained, it is necessary to return the register elements to the initial position before a new number and operation can be registered. FIG. 1 shows a bar 16 engaging projections 114*h*, and it will be understood that bar 16 also engages corresponding projections on register elements 114 and 214. As shown in detail in FIG. 14, bar 16 is mounted on a return slide 42 so that when slide 42 moves in direction of the arrow, the register elements are all returned to initial position in which they are again arrested by arresting means 17. In the embodiment illustrated in FIGS. 14 and 16, a cam 44 is mounted on shaft 25 which also carries cams 26 and 28, as described with reference to FIG. 15. When cam 44 turns in direction of the arrow in FIG. 16, a double-armed lever 46 is turned about the axis of shaft 46*a* while its cam follower roller 45 moves along the periphery of cam 44. One arm of lever 46 has an elongated slot 46*b* receiving a roller 42*a* which is mounted on slide 42. During oscillating movement of lever 46 under control of cam 44, slide 42 is moved to the right in FIGS. 14 and 16 against the action of spring 47. When cam follower roller 45 passes beyond the highest point of cam 44, slide 44 moves rapidly to the left under action of spring 47, while the register elements 14, 114, 214 move in the same direction under the action of springs 18 until they are blocked, for example by levers 13 in positions representing a numerical value and a computing operation.

After carriage 21 has been shifted by cam 26 as described above, it engages a switch $k_2$ as shown in FIG. 12, which is connected into the circuit of the electromagnetic releasing means 19, which are also shown in FIGS. 7, 8, 9, 13 and 14. Releasing means 19 operates the arresting means 17 to release all register elements in cooperation with spring 20, and in this moment cam 44, and lever 46 become effective to move slide 42 to the right, as viewed in FIG. 16 so that bar 16 withdraws all register elements to initial position. By electrical or mechanical means, relays $R_2$ and $R_3$ are de-energized by interruption of the holding circuit which is effective until this time, whereupon carriage 21 is returned by cam 28 to its initial position.

FIG. 12 also illustrates a circuit for preventing start of the motor of the computing machine before a sensing operation of switch means 500 is completed. When motor 32 is started by closing main switch 33, relay $R_5$ is energized, since it is connected parallel with motor 32. Contact $r_5$ closes, and when carriage 21 starts its movement, out of its initial position, contact $k_2$ closes and connects relay $R_6$ into the circuit. Relay $R_6$ opens the normally closed contact $r_6$, and since contact $r_5$ is closed, the motor continues running until the operation is terminated, and main switch 33 is opened. This results in de-energizing of relay $R_5$ so that contact $r_5$ opens. Since contact $r_6$ is still open, as long as carriage 21 has not been returned to initial position, starting of the motor during the sensing operation of carriage 21 and switches 500 is not possible.

However, after new information has been introduced into the register means, and an operational command given, the main switch 33 can again be connected. The operation starts, as soon as carriage 21 has arrived in initial position, relay $R_6$ is de-energized, and contact $r_6$ is thereby closed.

A machine according to the present invention is not only used for transmitting impulses representing numerical values and operations of computing and printing means, but also for receiving corresponding impulses from another transmitting machine either directly, or from a punched tape having perforations representing such numerical values on operations punched under control of a transmitting machine as above described. When the machine is used as a receiving machine, the register means 14, 114, 214 must be set in accordance with impulses received from a remote station, instead of being controlled from the keyboard of the machine, as described above. After information received from a remote station is registered in the register means, it is transferred into the computing devices of the receiving machine, and printed in the receiving machine.

Input means for this purpose will now be described particularly with reference to FIGS. 13, 13*a*, 18, 19 and 20.

The register elements have portions extending beyond the region of the carriage means 21 and toward the intermediate levers 13 and the main levers 11. As shown in FIGS. 13, 13*a*, 18, 19 and 20*b*, an additional projection 14*g* is provided on these portions of the register elements 14, and as best seen in FIG. 18, projections 114*g* are provided on the register elements 114, or on corresponding register elements for operations 214. In the construction of FIGS. 13 and 13*a*, the projections 14*g* and 114*g* are located on the top edge of the register elements, whereas in the construction of FIGS. 18 and 14, the projections are located on the lower edge of the register elements. The operation of the two constructions is in no way influenced by this modification. In the construction of FIGS. 13, 13*a*, 19 and 20, a set of input members 51, shown to be transversely extending bars, are located above the register elements 14 and 114 to cooperate with the respective projections 14*g* and 114*g*. In the construction of FIGS. 14 and 18, the transverse input bars 51 are located below the register elements to cooperate with projections 14*g* and 114*g*.

The set of input bars 51 is controlled by a de-coding device 151 shown in the right hand portion of FIG. 13*a* which is a side view of the left hand portion. The decoding device 151 includes a set of electromagnetic operating means 52 which are respectively connected to angular levers controlling the input bars 51. Since each input bar is mounted on a pair of levers, the input bars 51 can be controlled to move between a position located in the path of projections 114*g* and 14*g*. In the construction of FIG. 13*a*, the input bars are lowered to cooperate with the projections, and in the arrangement of FIG. 18 the input bars are raised to cooperate with projections 14*g* and 114*g*. Ten input bars 51 are provided which are respectively associated with the positions which projections 14*a* assume in accordance with the digits zero to nine. The first input bars 51 from the right as viewed in FIG. 13*a*, are also associated with the six positions which the projections 114*b* and 114*c* assume for representing operations.

An arresting means 17 is mounted for turning and axial movement on a shaft 170 and which constitutes an arresting lever pivotable about a longitudinal axis between an arresting position in which the upper edge thereof arrests a notch between teeth of register elements 14 and 114, and a disengaged position releasing the register elements for movement as explained above. This edge of arresting means 17 has a cutout 17*a* and arresting means 17 is movable in longitudinal direction thereof between a plurality of releasing positions in which the cutout 17*a* is located in the plane of a register element, so that the respective register element is released for movement. In the intermediate positions of arresting means 17 in which the cutout is located between two adjacent register elements, all register elements are arrested. Consequently, turning movement of arresting means 17 will simultaneously release all elements, whereas shifting movement of the arresting means 17 will consecutively release single register elements, while all other elements are blocked and arrested.

At the beginning of an operation under control of the input means 51, all register elements are in initial position to which they were moved by bar 16, and are arrested by the arresting means 17.

When the first coded impulse arrives from a remote transmitting machine, it is de-coded in the de-coding device 151 and the first electromagnetic means 51 is energized to move the respective associated input bar 51 to an operative position in which it is located in the path of all projections 14*g* and 114*g*.

At the same time, the electromagnetic means 53 is energized which controls a stepping mechanism 54 having catch means cooperating with teeth provided along one edge of arresting means 17. Electromagnetic means 53 is connected in series with all electromagnetic means 52, so that the stepping mechanism 54 is actuated whenever any one of electromagnetic means 52 is energized. Release of the stepping mechanism 54 by electromagnetic means 53 results in movement of the arresting means in direction of the arrow in FIG. 13*a* under action of a spring 55. After a step corresponding to half the distance between two register elements 14, the arresting means 17 is again stopped. Starting from the initial position shown in FIG. 13*a*, the cutout is now aligned with the first register element 14, so that this register element is released, and moves under action of spring 18 to the left in FIG. 13*a*, until the respective projection 14*g* engages the respective shifted input bar 51. The respective shifted input bar 51 represents the digit which is to be introduced into the highest order of the number, and consequently, the respective first released register element 14 is stopped by the actuated input bar 51 in a position in which its projection 14*a* is located opposite a switch means 501 associated with the same digit as the respective actuated input bar 51. This position is illustrated in FIG. 19 where it is shown how projection 14*g* engages an input bar 51' which is the sixth from the right, and consequently corresponds to the digit 4. Projection 14*a* of the register element associated with the highest order will now be located in the path of switch means 501 associated with the digit 4, and consequently during a following movement of the carriage 21, the respective switch means 501 will be actuated. Before this takes place, however, all other register elements 14 are placed in positions representing digits in the respective orders, and the register element 114 is placed in a position representing the respective operations. As soon as the first electromagnetic means 52 is de-energized together with the electromagnetic means 53, the stepping mechanism 54 is again released, and arresting means 17 moves another step to a position in which cut out 17*a* is located between two register elements 14 so that all register elements are arrested. At the same time, the previously actuated input bar 51' returns from its operative position to its inoperative position shown in FIG. 20. The next coded impulse arrives, and effects shifting of the second input bar 51 to operative position, whereupon the arresting means 17 moves to a position releasing the register element 14 associated with a second highest order. The operations are continued until the cutout 17*a* arrives in a position cooperating with the register element 114 for operations. The arriving impulse is no longer associated with digits, but is associated with operations, and if, for example, the first input bar 51 on the right of FIG. 13*a* is shifted to operative position, register element 114 will move one step until its projection 114*g* engages the first input bar. In this position, assuming an arrangement as shown in FIG. 7, the projection 114*b* will be located in the path of switch means 502 associated with plus, and the projection 114*c* will be located in the path of movement of switch means 503 associated with sub-total. When the arresting means arrives in its end position after releasing each of the register elements, as above described, a contact $k_3$ is closed which is connected into the circuit of the computing machine, and releases the operational cycle of the same. During such operation cycle of the computing machine, the main levers 11 drop with the intermediate levers 13 until the intermediate levers 13 are stopped by the respective associated register elements 14 and 114 which are in a position representing a number and an operation. Consequently, the same number and operation is expressed by the position of the main levers 12, and is transferred into the accumulator of the receiving transmitting machine and may be printed.

If it is desired to check the thus stored numerical value, an automatic operation can be carried out in which a switch operated from the main drive shaft of the computing machine by a cam, energizes the motor by which carriage 21 is operated. Thereupon, the carriage 21 moves with the row of switch means 500 across the register elements 14 and 114, and coded impulses are produced at the output lines of the machine which must represent the same number and operation as was stored in the receiving computing machine as above described.

The stepwise movement of the arresting means 17 between the releasing positions in which the register elements are individually released, can be also obtained by the modified construction shown in FIGS. 14, 16 and 24.

The arresting means 17 is turnably mounted on a carriage 66 which is mounted on rails 67 by means of balls for movement in a direction transverse to the register elements 14. A spring 63, see FIG. 14, acts through a band on the carriage 66 similar to the construction of a typewriter carriage. A pinion 64 engages a rack portion of a bar 65 of carriage 66, and is controlled by an escape mechanism, best seen in FIG. 24. The releasing electromagnetic means 53 acts on stepping pawls 70 and 71 which are mounted on a member which is turnable about a pair of pins 73 and 73*a*. The releasing device shown in FIG. 24 will obtain successive stepwise movement of the carriage 66 so that the arresting means 17 is stepwise moved to successively release each of the register elements 14 and 114, as described above with reference to FIG. 13a. The electromagnetic means 19 is also provided, as shown in FIG. 14, to move the arresting means 17 to a disengaged position in which all register elements are simultaneously movable as is required for an operation under control of the keyboard of the machine.

Return of carriage 66, and tensioning of spring 63, is effected by the double-armed lever 68, see FIG. 16, which is turnable about a pin 68*a*, and engages with a slot 68*b* a roller mounted on carriage 66. The other arm of lever 68 carries a roller 69 which is controlled by a cam 70 on shaft 25. Shaft 25 controls the return movement of the register elements through cam 44, lever 46, and slide 42, so that the operations are synchronized. After carriage 66 has effected registering of a numerical value and of an operation in the register elements 14, 114 under control of a remote machine, it is returned to its initial position by lever 68 under control of cam 17.

It is of advantage to reduce the mass of the register elements for obtaining a more rapid movement of the register elements. FIGS. 21–23 illustrate modified constructions of the register elements which serve this purpose. The register elements consist of two parts, one part cooperating with the carriage 21 and the switch means 500, and the other part cooperating with the input means 51.

In the construction of FIG. 21, the left part 414 of the register elements cooperates with the input bars 51 and is controlled and operated by arresting means 17 in the manner described in detail with reference to FIG. 13. Register elements 414 have projections 414*g* engaged by shifted input bars 51, and are retracted by a bar 16. The right part 514 has a projection 514*f* which cooperates with the switch means 500, when desired. Another arresting means 17′ controlled by spring 20′ and by electromagnetic means 19′ is provided for register elements 514.

When a number and operation is introduced into the machine from a remote station, it is only necessary to operate the register elements 414 by longitudinally shifting the arresting means 17 with cutout 17*a*, as described with reference to FIG. 13. If the machine acts as transmitting machine under control of the keyboard, both electromagnetic means 19 and 19′ are simultaneously actuated to release register elements 414 and 514 which move simultaneously, with each register element 514 engaging an associated register element 414 during movement to the left in FIG. 21 under control of springs 18 and 18′.

It is desired to check a value introduced through input means 51 from a remote station into the accumulator of the receiving machine, the register elements 514 are also released, so that they assume corresponding positions in the same manner as described above for the integral register elements shown in FIG. 13.

The construction of FIG. 22 reduces the noise produced by register elements when stopped by intermediate levers 13 after movement to the left. The upper part 614 of each register element is always in engagement with the intermediate levers 13, so that an impact of the register elements on levers 13 is avoided. The lower parts 714 cooperate with the input bar means 51, as previously described with reference to FIG. 21. The intermediate levers 13 have extensions 13*a* cooperating with register elements 714.

In the construction of FIG. 23, the length of intermediate levers 13 is reduced to reduce the mass of levers 13, and in this arrangement the register elements 614 have a lateral projection on the end which cooperates with levers 13, and the register elements 714 abut on the lateral projections of the associated register elements 614. The portions 13*a* of the intermediate levers 13 are in constant engagement with the ends of register elements 614, while the register elements 714 are controlled by the input means 51, and act only through the lateral projections of the associated register elements 614 on the levers 13.

In accordance with the modified embodiment of the present invention, the register elements 14 and 114 are used for setting a punching device for cards which is associated with the machine. In this construction, the register elements are provided with extensions projecting into the punching device, and associated with a set of punches for setting the same corresponding to the position assumed by the register elements 114 and 14. It is necessary to space switch means 500 from each other a distance corresponding to the spacing of index positions and perforations of punched cards, for example a distance of 6.35 mm. For example, if one of the register elements 14 is shifted one step from its initial position, so that projection 14*a* is associated with the digit 9, the respective punch associated with the same order is shifted to a position located over a field of the card associated with the digit 9. If the respective register element is shifted two steps, the respective punch will be located over the field associated with the digit 8.

The punching device can be electrically controlled as well, and the essential elements of this construction are shown in FIG. 25. Each switch means 500 has an addition to the contact means 510 which control the output lines, a contact means 81 or 82, respectively. A source of current is schematically indicated at 83. Contacts 81 and 82, as well as the electromagnetic operating means of the punching device are connected into the circuit of the source of current 83. When register elements 14 and 114 are in positions effecting closing of contact 81 and 82, the associated punches will be set in proper positions for punching corresponding holes into a card or other record carrier.

The above described embodiments of the present invention use a code consisting of five code elements. However, if it is desired to operate an electronic computer requiring a code of four code elements, the switch means 500 can be exchanged for other switch means having differently arranged contact means 510 which are connected to four output lines. A particularly advantageous arrangement of the present invention provides socket means on the carriage 21, and a plurality of exchangeable sets of switch means 500 which can be plugged into the socket means of the carriage in accordance with the desired code.

The apparatus of the present invention is operated in the following manner:

*(1) Transmission*

A number is set on the keyboard, and the keys associated with the respective desired operation and sign is also actuated. The pin carriage stores all the information, and is sensed by levers 11 so that levers 13 assume a position representing the respective number and operation. The electromagnetic means 19 is energized under control of the main drive shaft of the computing machine, for example by a cam operated contact. This results in release of the register elements by arresting means 17 so that register elements 14 and 114, or 214 move until they are stopped by the intermediate levers 13. The register elements are now in a position representing the respective number and operation, and are again arrested by arresting means 17 in this position. The projections 14*a*, 114*b*, and 114*c* are now located in the path of predetermined switch means 501, 502 and 503.

The drive shaft 25, see FIG. 15, turns cams 26 and 28 in timed relationship with the operation of levers 11, so that the carriage 21 is moved across the register means 14, 114 so that first the switch means 501 are actuated in all orders of the registered number, and then the switch means 502 and 503 are successively actuated by register element 114. Actuated switch means produce by closing contacts 510 coded impulses in the output lines as shown in FIG. 2. Such coded signals may be used for directly controlling a computing machine, or may be used for punching a tape from which teletype machines are controlled.

When carriage 21 has again been returned to its initial position, the arresting means 17 is released by a contact operated by the carriage 21 in its end position, and the thus released register elements are returned by bar 16 engaging projections 14*h* and 114*h*. Bar 16 is mounted on a slide 23 which is controlled by a lever 46 and by a cam 24 as shown in FIG. 26, and consequently, the return of the register elements to initial position takes place in timed relationship with the other operations. Electromagnetic means 19 are again effective to arrest register elements 14, 114, or 214 in initial position. During the operational cycle of the computing machine, the main levers 111 and the pin carriage return to initial positions.

*(2) Reception*

Consecutive impulses arriving from a transmitting station at the de-coding device 151 effect consecutive shifting of the input bars 51. The input bars 51 are not associated with orders, but with digits and operations. The orders of transmitted and received numbers are consecutively registered in the register elements, since the cutout 17*a* successively releases each register element for movement until an operative input bar stops the respective register element in a position representing a digit, or one of the seven operations which can be carried out by the machine. During the following operational cycle of the receiving computing machine, levers 11, 12, 13 drop until they are stopped by the displaced register elements, and consequently represent the same number and operation as was introduced into the register elements. Main levers 11 transfer the registered number and operation into the storing means of the receiving machine. The correctness of the stored and printed number can be checked by moving carriage 21 across the register elements while the same still represent the respective number so that the five output lines receive coded impulses. In any event, after the number and operation has been stored in the computing machine, the arresting means 17 is returned to its initial position, and the register elements are retracted by bar 16 to initial position, whereupon they are again locked by arresting means 17 to be ready for the next operation.

It will be understood that each of the elements described above, or two or more together, may also find a useful application in other types of transmitting and receiving computing machines differing from the types described above.

While the invention has been illustrated and described as embodied in an apparatus including register means for registering information under control of a keyboard or under control of a remote station, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a device of the type described, in combination, a set of first differential elements respectively associated with the orders of a number, and at least one second differential element associated with computing operations, said elements being movable in one direction and independently of each other between a plurality of operative positions for representing different digits and different computing operations, respectively; a support movable in a transverse direction between a plurality of shifted positions respectively associated with different elements of said elements; a row of switch means mounted on said support and extending in each shifted position of said support in the direction of movement of the respective associated element, each switch means including a plurality of contacts, said row of switch means including a first set of switch means respectively associated with digits and with said first differential elements and at least one second switch means associated with computing operations and with said second differential element, each of said elements engaging and actuating in each of said positions thereof one of the associated switch means while said support is in one of said shifted positions; output circuit means including a set of output lines connected to said switch means and, respectively, adapted to transfer impulses representing different elements of a code, selected groups of output lines being connected to the contacts of each switch means so that a selected combination of output lines is energized to represent a coded signal when each switch means is actuated; control means for moving said elements between said positions thereof, and including a set of input members respectively associated with the orders of a number and at least one input member associated with computing operations, each of said input members being movable between a plurality of positions for representing digits and computing operations, respectively, each of said input members holding, when actuated, an associated differential element in one of said operative positions so that said elements represent a number and a computing operation; and operating means for moving said support between said positions thereof when said input members hold said elements in positions representing information so that the information is translated into coded impulses in said output lines.

2. In a device of the type described, in combination, a set of first differential elements respectively associated with the orders of a number, and at least one second differential element associated with computing operations, said elements being movable in one direction and independently of each other between a plurality of operative positions for representing different digits and different computing operations, respectively; a support movable in a transverse direction between a plurality of shifted positions respectively associated with different elements of said elements; a row of switch means mounted on said support and extending in each shifted position of said support in the direction of movement of the respective associated element, each switch means including a plurality of contacts, said row of switch means including a first set of switch means respectively associated with digits and with said first differential elements and at least one second switch means associated with computing operations and with said second differential element, each of said elements engaging and actuating in each of said positions thereof one of the associated switch means while said support is in one of said shifted positions; output circuit means including a set of output lines connected to said switch means and, respectively, adapted to transfer impulses representing different elements of a code, selected groups of output lines being connected to the contacts of each switch means so that a selected combination of output lines is energized to represent a coded signal when each switch means is actuated; control means for moving said elements between said positions thereof, and including a set of input members respectively associated with the orders of a number and at least one input member associated with computing operations, each of said input members being movable between a plurality of positions for representing digits and computing operations, respectively, each of said input members holding, when actuated, an associated differential element in one of said operative positions so that said elements represent a number and a computing operation, each input member including a manually controlled input element and an electrically controlled input element adapted to be actuated from a remote station; and operating means for moving said support between said positions thereof when said input members hold said elements in positions representing information so that the information is translated into coded impulses in said output lines.

3. In a device of the type described, in combination, a set of first differential elements respectively associated with the orders of a number, and at least one second differential element associated with computing operations, said elements being movable in one direction and independently of each other between a plurality of operative positions for representing different digits and different computing operations, respectively; a support movable in a transverse direction between a plurality of shifted positions respectively associated with different elements of said elements; a row of switch means mounted on said support and extending in each shifted position of said support in the direction of movement of the respective associated element, each switch means including a plurality of contacts, said row of switch means including a first set of switch means respectively associated with digits and with said first differential elements and at least one second switch means associated with computing operations and with said second differential element, each of said elements engaging and actuating in each of said positions thereof one of the associated switch means while said support is in one of said shifted positions; output circuit means including a set of output lines connected to said switch means and, respectively, adapted to transfer impulses representing different elements of a code, selected groups of output lines being connected to the contacts of each switch means so that a selected combination of output lines is energized to represent a coded signal when each switch means is actuated; arresting means for arresting said elements; releasing means controlled by said support in one end position of the same for releasing said arresting means so that said differential elements move in said one direction; a set of input members respectively associated with the orders of a number and at least one input member associated with computing operations, each of said input members being movable between a plurality of positions for representing digits and computing operations, respectively, each of said input members blocking, when actuated, an associated differential element in one of said operative positions so that said elements represent a number and a computing operation; and operating means for moving said support between said positions thereof when said input members hold said elements in positions representing information so that the information is translated into coded impulses in said output lines.

4. In a device of the type described, in combination, a set of differential elements, each element being movable in one direction indipendently of the other elements between a plurality of positions for representing information and tending to move in said one direction; a support movable in a transverse direction between a plurality of shifted positions respectively associated with different elements of said elements; a row of switch means mounted on said support and extending in each shifted position of said support in the direction of movement of the respective associated element, each switch means including a plurality of contacts, each of said elements engaging and actuating in each of said positions thereof one of said switch means while said support is in one of said shifted positions; output circuit means including a set of output lines connected to said switch means and, respectively, adapted to transfer impulses representing different elements of a code, selected groups of output lines being connected to the contacts of each switch means so that a selected combination of output lines is energized to represent a coded signal when each switch means is actuated; arresting means for arresting said elements; releasing means controlled by said support in one end position of the same for releasing said arresting means so that said differential elements move in said one direction; input means for blocking the movement of said elements in positions representing information introduced into said input means, said input means including a first set of manually controlled input members and a second set of electrically controlled input members adapted to be actuated from a remote station, each input member of said first set, each input member of said second set, and each differential element being respectively associated with numbers and with computing operations; and operating means for moving said support between said positions thereof when said control means hold said elements in positions representing information so that the information is translated into coded impulses in said output lines.

5. In an apparatus for the transmission of impulses representing numerical values and computing operations, in combination, a set of first differential elements respectively associated with orders of a number, and at least one second element associated with computing operations, said elements being movable parallel to each other and independently of the other elements between a plurality of operative positions for representing different digits and different computing operations, respectively, each element having a projection; means associated with each of said elements for urging said elements to move in one direction; return means for returning all said elements in the opposite direction to a normal position; releasable arresting means for arresting said elements in each of said operative positions; a supporting carriage movable in a transverse direction between a plurality of shifted positions respectively associated with different elements of said elements; a row of switch means mounted on said supporting carriage and extending in each shifted position of said supporting carriage in the direction of movement of the respective associated element, said row of switch means including a set of first switch means respectively associated with digits and at least one set of second switch means associated with computing operations and with said second element, each switch means including a plurality of contacts, said projection of each of said elements engaging and actuating in each of said operative positions thereof one of the associated switch means while said supporting carriage is in one of said shifted positions; output circuit means including a set of output lines connected to said switch means and, respectively, adapted to transfer impulses representing different elements of a code, selected groups of output lines being connected to the contacts of each switch means so that a selected combination of output lines is energized to represent a coded signal when each switch means is actuated; releasing means controlled by said supporting carriage in one end positions of the same for releasing said arresting means so that said elements move in said one direction; input means including a set of input members respectively associated with orders of a number, and at least one input member associated with computing operations, each of said input members being movable between a plurality of positions for representing digits and computing operations, respectively, each of said input members blocking an associated differential element in one of said operative positions during movement in said one direction when the respective input member is actuated; and operating means for moving said supporting carriage between said positions thereof when said input members hold said elements in positions representing a number and a computing operation so that information introduced into said input means is translated into coded impulses in said output lines.

6. In an apparatus for the transmission of impulses representing numerical values and computing operations, in combination, a set of first differential elements respectively associated with orders of a number, and at least one second element associated with computing operations, said elements being movable independently of the other elements between a plurality of operative positions for representing different digits and different computing operations, respectively; a supporting carriage movable in a transverse direction between a plurality of shifted positions respectively associated with different elements of said elements; a row of switch means mounted on said supporting carriage and extending in each shifted positions of said supporting carriage in the direction of movement of the respective associated element, said row of switch means including a set of first switch means respectively associated with digits and two sets of second switch means associated with computing operations and with said second element, each switch means including a plurality of contacts, each of said first elements engaging and actuating in each of said operative positions thereof one of the associated first switch means, and said second element engaging and actuating in each of said positions thereof one second switch means of each set of second switch means while said supporting carriage is in one of said shifted positions; output circuit means including a set of output lines connected to said switch means and, respectively, adapted to transfer impulses representing different elements of a code, selected groups of output lines being connected to the contacts of each switch means so that a selected combination of output lines is energized to represent a coded signal when each switch means is actuated; input means including a set of input members respectively associated with orders of a number, and at least one input member associated with computing operations, each of said input members being movable between a plurality of positions for representing digits and computing operations, respectively, each of said input members holding an associated differential element in one of said operative positions when the respective input member is actuated; and operating means for moving said supporting carriage between said positions thereof when said input members hold said elements in positions representing a number and a computing operation so that information introduced into said input means is translated into coded impulses in said output lines.

7. In an apparatus for the transmission of impulses representing numerical values and computing operations, in combination, a set of first differential elements respectively associated with orders of a number, and at least one second element associated with computing operations, said elements being movable independently of the other elements between a plurality of operative positions for representing different digits and different computing operations, respectively, said second element having two projections; a supporting carriage movable in a transverse direction between a plurality of shifted positions respectively associated with different elements of said elements; a row of switch means mounted on said supporting carriage and extending in each shifted position of said supporting carriage in the direction of movement of the respective associated element, said row of switch means including a set of first switch means respectively associated with digits and two sets of second switch means associated with computing operations and with said second element, each switch means including a plurality of contacts, each of said first elements engaging and actuating in each of said operative positions thereof one of the associated first switch means, and said two projections of said second element engaging and actuating in each of said positions thereof one second switch means of each set of second switch means while said supporting carriage is in one of said shifted positions; output circuit means including a set of output lines connected to said switch means and, respectively, adapted to transfer impulses representing different elements of a code, selected groups of output lines being connected to the contacts of each switch means so that a selected combination of output lines is energized to represent a coded signal when each switch means is actuated; input means including a set of input members respectively associated with orders of a number, and at least one input member associated with computing operations, each of said input members being movable between a plurality of positions for representing digits and computing operations, respectively, each of said input members holding an associated differential element in one of said operative positions when the respective input member is actuated; and operating means for moving said supporting carriage between said positions thereof when said input members hold said elements in positions representing a number and a computing operation so that information introduced into said input means is translated into coded impulses in said output lines.

8. In an apparatus for the transmission of impulses representing numerical values and computing operations, in combination, a set of first differential elements respectively associated with orders of a number, and at least one second element associated with computing operations, said elements being movable independently of the other elements between a plurality of operative positions for representing different digits and different computing operations, respectively; a supporting carriage movable in a transverse direction between a plurality of shifted positions respectively associated with different elements of said elements; a row of switch means mounted on said supporting carriage and extending in each shifted position of said supporting carriage in the direction of movement of the respective associated elements, said row of switch means including a set of first switch means respectively associated with digits and at least one set of second switch means associated with computing operations and with said second element, each switch means including a plurality of contacts, each of said first elements engaging and actuating in each of said operative positions thereof one of the associated first switch means while said supporting carriage is in one of said shifted positions; output circuit means including a set of output lines connected to said switch means and, respectively, adapted to transfer impulses representing different elements of a code, selected groups of output lines being connected to the contacts of each switch means so that a selected combination of output lines is energized to represent a coded signal when each switch means is actuated; input means including a set of first manually controlled input members respectively associated with orders of a number, and at least one first manually controlled input member associated with computing operations, each of said first manually controlled input members being movable between a plurality of positions for representing digits and computing operations, respectively, said input means including a set of second electrically actuated input members adapted to be controlled from a remote station, each of said input members holding an associated differential element in one of said operative positions when the respective input member is actuated; and operating means for moving said supporting carriage between said positions thereof when said input members hold said elements in positions representing a number and a computing operation so that information introduced into said input means is translated into coded impulses in said output lines.

9. An apparatus as set forth in claim 8 wherein said set of second input members is a set of bars extending across said differential elements and respectively associated with digits and operations, and wherein each of the differential elements has a projection cooperating with said bars, and including electromagnetic means for consecutively shifting each of said bars to a position located in the path of the projection of one of said differential elements for blocking the respective element.

10. In an apparatus for the transmission of impulses representing numerical values and computing operations, in combination, a set of first differential elements respectively associated with orders of a number, and at least one second element associated with computing operations, said elements being movable parallel to each other and independently of the other elements between a plurality of operative positions for representing different digits and different computing operations, respectively, each first element having one projection and each second element having two projections; means associated with each of said elements for urging said elements to move in one direction; return means for returning all said elements in the opposite direction to a normal position; releasable arresting means for arresting said elements in each of said operative positions; a supporting carriage movable in a transverse direction between a plurality of shifted positions respectively associated with different elements of said elements; a row of switch means mounted on said supporting carriage and extending in each shifted position of said supporting carriage in the direction of movement of the respective associated element, said row of switch means including a set of first switch means respectively associated with digits and two sets of second switch means associated with computing operations and with said second element, each switch means including a plurality of contacts, each of said first elements engaging and actuating in each of said operative positions thereof one of the associated first switch means, and said two projections of said second element engaging and actuating in each of said positions thereof one second switch means of each set of second switch means while said supporting carriage is in one of said shifted positions; output circuit means including a set of output lines connected to said switch means, selected groups of output lines being connected to the contacts of each switch means so that a selected combination of output lines is energized when each switch means is actuated; releasing means controlled by said supporting carriage in one end position of the same for releasing said arresting means so that said elements move in said one direction; input means including a set of input members respectively associated with orders of a number, and at least one input member associated with computing operations, each of said input members being movable between a plurality of positions for representing digits and computing operations, respectively, each of said input members blocking an associated differential element in one of said operative positions during movement in said one direction when the respective input member is actuated; and operating means for moving said supporting carriage between said positions thereof when said input members hold said elements in positions representing a number and a computing operation so that information introduced into said input means is translated into coded impulses in said output lines.

11. In an apparatus for the transmission of impulses representing numerical values and computing operations, in combination, a set of first differential elements respectively associated with orders of a number, and at least one second element associated with computing operations, said elements being movable parallel to each other and independently of the other elements between a plurality of operative positions for representing different digits and different computing operations, respectively, each first element having one projection and each second element having two projections; means associated with each of said elements for urging said elements to move in one direction; return means for returning all said elements in the opposite direction to a normal position; releasable arresting means for arresting said elements in each of said operative positions; a supporting carriage movable in a transverse direction between a plurality of shifted positions respectively associated with different elements of said elements; a row of switch means mounted on said supporting carriage and extending in each shifted position of said supporting carriage in the direction of movement of the respective associated element, said row of switch means including a set of first switch means respectively associated with digits and two sets of second switch means associated with computing operations and with said second element, each switch means including a plurality of contacts, said projection of each of said first elements engaging and actuating in each of said operative positions thereof one of the associated first switch means, and said two projections of said second element engaging and actuating in each of said positions thereof one second switch means of each set of second switch means while said supporting carriage is in one of said shifted positions; output circuit means including a set of output lines connected to said switch means, selected groups of output lines being connected to the contacts of each switch means so that a selected combination of output lines is energized when each switch means is actuated; releasing means controlled by said supporting carriage in one end position of the same for releasing said arresting means so that said elements move in said one direction; input means including a set of first manually controlled input members respectively associated with orders of a number, and at least one first manually controlled input member associated with computing operations, each of said first manually controlled input members being movable between a plurality of positions for representing digits and computing operations, respectively, said input means including a set of second electrically actuated input members adapted to be controlled from a remote station, each of said input members blocking an associated differential element in one of said operative positions during movement in said one direction when the respective input member is actuated; and operating means for moving said supporting carriage between said positions thereof when said input members hold said elements in positions representing a number and a computing operation so that information introduced into said input means is translated into coded impulses in said output lines.

12. In an apparatus for the transmission of impulses representing numerical values and computing operations, in combination, a set of first differential elements respectively associated with orders of a number, and at least one second element associated with computing operations said elements being movable independently of the other elements between a plurality of operative positions for representing different digits and different computing operations, respectively; a supporting carriage movable in a transverse direction between a plurality of shifted positions respectively associated with different elements of said elements; a row of switch means mounted on said supporting carriage and extending in each shifted position of said supporting carriage in the direction of movement of the respective associated element, said row of switch means including a set of first switch means respectively associated with digits and at least one set of second switch means associated with computing operations and with said second element, each switch means including a plurality of contacts, each of said elements engaging and actuating in each of said operative positions thereof one of the associated switch means while said supporting carriage is in one of said shifted positions; output circuit means including a set of output lines connected to said switch means, selected groups of output lines being connected to the contacts of each switch means so that a selected combination of output lines is energized when each switch means is actuated; input means including a set of electrically actuated input bars extending across said differential elements and adapted to be successively shifted from a remote station to operative positions blocking selected differential elements in one of said operative positions during movement in said one direction; and operating means for moving said supporting carriage between said positions thereof when said input bars hold said elements in positions representing a number and a computing operation so that information introduced into said input means in translated into coded impulses in said output lines.

13. In combination with a computing machine, an apparatus for the transmission and reception of impulses representing numerical values and computing operations, comprising, in combination, a register means including a set of first slides respectively associated with the orders of a number, and at least one second slide associated with computing operations, said slides being movable parallel to each other and independently of each other, said first slide being movable between a plurality of operative positions for representing digits, and said second slide being movable between a plurality of operative positions respectively associated with different computing operations and signs; means associated with each of said slides for urging said slides to move in one direction; first input means adapted to be manually controlled from the keyboard of the computing machine, and including a set of first input members respectively associated with orders and being each movable between a plurality of operative positions associated with digits, and at least one second input member associated with computing operations, each first input member being aligned with one of said first slides and said second input member being aligned with said second slide so as to block the respective slides during movement in said one direction; second input means including a set of first input bars extending across said slides and being respectively associated with digits and at least one of said input bars associated with computing operations and signs; electro-magnetic actuating means associated with each of said input bars and being adapted to be energized from a remote station to successively move each of said input bars to an operative blocking position located in the path of movement of said first and second slides to block the respective slide during movement in said one direction; arresting means for arresting said slides and being movable in transverse direction to a plurality of releasing positions for successively releasing each of said slides, and being also shiftable to a disengaged position for simultaneously releasing all said slides; first releasing means connected to said electromagnetic actuating means for operation in timed relationship and being connected to said arresting means for moving the same successively to said releasing position, and second releasing means for shifting said arresting means to said disengaged position; means for selectively actuating said first and second releasing means; a supporting carriage movable in a transverse direction from an initial position to a plurality of shifted positions respectively associated with different slides; a row of switch means mounted on said supporting carriage and extending in each shifted position of said carriage in the direction of movement of the respective associated slide, said row of switch means including a set of first switch means respectively associated with digits and at least one set of second switch means associated with computing operations and signs and with said second slide, each switch means including a plurality of contacts, each of said slides engaging and actuating in each of said operative positions thereof one of the associated switch means while said carriage is in one of said shifted positions; output circuit means including a set of output lines connected to said switch means, selected groups of output lines being connected to the contacts of each switch means so that a selected combination of output lines is energized when each switch means is actuated; and operating means for successively moving said carriage from said initial position to said shifted positions and back, and all said slide means in opposite direction to an inoperative normal position.

14. In combination with a computing machine, an apparatus for the transmission and reception of impulses representing numerical values and computing operations, comprising, in combination, a register means including a set of first slides respectively associated with the orders of a number, and at least one second slide associated with computing operations, said slides being movable parallel to each other and independently of each other, said first slide being movable between a plurality of operative positions respectively associated with different computing operations and signs; means associated with each of said slides for urging said slides to move in one direction; first input means adapted to be manually controlled from the keyboard of the computing machine, and including a set of first input members respectively associated with orders and being each movable between a plurality of operative positions associated with digits, and at least one second input member associated with computing operations, each first input member being aligned with one of said first slides and said second input member being aligned with said second slide so as to block the respective slides during movement in said one direction; second input means including a set of first input bars extending across said slides and being respectively associated with digits and at least one of said input bars associated with computing operations and signs; electro-magnetic actuating means associated with each of said input bars and being adapted to be energized from a remote station to successively move each of said input bars to an operative blocking position located in the path of movement of said first and second slides to block the respective slide during movement in said one direction; arresting means for arresting said slides and being movable in transverse direction to a plurality of releasing positions for successively releasing each of said slides, and being also shiftable to a disengaged position for simultaneously releasing all said slides; first releasing means connected to said electro-magnetic actuating means for operation in timed relationship and being connected to said arresting means for moving the same successively to said releasing positions, and second releasing means for shifting said arresting means to said disengaged position; means for selectively actuating said first and second releasing means; a supporting carriage movable in a transverse direction from an initial position to a plurality of shifted positions respectively associated with different slides; a row of switch means mounted on said supporting carriage and extending in each shifted position of said carriage in the direction of movement of the respective associated slide, said row of switch means including a set of first switch means respectively associated with digits, a first set of second switch means associated with calculating signs, and a second set of second switch means associated with computing operations, said second switch means being associated with said second slide, each switch means including a plurality of contacts, each of said first slides engaging and actuating in each of said operative positions thereof an associated first switch means, and said second slide engaging and actuating in each of said operative positions thereof one second switch means of said first set, and one second switch means of said second set of switch means while said carriage is in one of said shifted positions; output circuit means including a set of output lines connected to said switch means and, respectively, adapted to transfer impulses representing different elements of a code, selected groups of output lines being connected to the contacts of each switch means so that a selected combination of output lines is energized to represent a coded signal when each switch means is actuated; and operating means for successively moving said carriage from said initial position to said shifted positions and back, and all said slide means in opposite direction to an inoperative normal position.

15. An apparatus as set forth in claim 14 wherein each first slide has a projection for actuating said first switch means, and wherein said second slide has a first portion having one projection, and a second portion offset with respect to said first portion and having the other projection so that said two projections of said second slide are consecutively operative in consecutive shifted positions of said carriage to actuate the respective two second switch means.

16. An apparatus as set forth in claim 15 wherein said second slide is arranged forwardly of said first slides in the direction of movement of said carriage so that said second switch means are last actuated.

17. An apparatus as set forth in claim 14 wherein each of said first slides has a projection for actuating said first switch means, and wherein said second slide is forked and has a first portion located rearwardly, and a second portion located forwardly of said first slides in the direction of movement of said carriage, each of said first and second portions having a projection, said last-mentioned projections actuating said two second switch means so that the second switch means of said second set are first actuated and said second switch means of said first set are last actuated.

18. An apparatus as set forth in claim 14 wherein said second switch means of said first set have contacts for transmitting through said output lines coded signals respectively representing plus, minus, minus, non-addition, plus, minus and plus, and wherein said second switch means of said second set have contacts for transmitting through said output lines coded signals respectively representing a spacing step, total, sub-total, a spacing step, total, spacing step and sub-total.

19. An apparatus as set forth in claim 14 wherein said second switch means of said first set have contacts for transmitting through said output lines coded signals respectively representing plus, minus, non-addition, plus, minus, and minus and wherein said second switch means of said second set have contacts for transmitting through said output lines coded signals respectively representing a spacing step, a spacing step, a spacing step, sub-total, total, sub-total and total.

20. An apparatus as set forth in claim 14 wherein each of said slides has another projection cooperating with said input bars and engaging input bars in shifted position during movement of the respective slide.

21. An apparatus as set forth in claim 14 wherein said slides have arresting teeth, wherein said arresting means is a bar mounted for longitudinal movement between said releasing positions, and for turning movement from an arresting position engaging said arresting teeth to said disengaged position releasing all said slides, said bar having a cutout successively aligned with said teeth of said slides in said releasing positions to permit movement of said slides.

22. An apparatus as set forth in claim 21 wherein said second releasing means include an electromagnetic releasing means connected to said arresting means for effecting turning the same between said disengaged position and said arresting position.

23. An apparatus as set forth in claim 22 and including a slide movable in transverse direction and supporting said arresting bar for turning movement thereon, said slide being movable with said bar in longitudinal direction of the bar for moving the same between said releasing positions, said slide also supporting said second releasing means, said slide having a rack bar portion; wherein said first releasing means include gear meshing with the rack bar portion, and electro-magnetic means for turning said gear.

24. An apparatus as claimed in claim 14 wherein said operating means include cam means adapted to be driven from the drive of the computing machine, and wherein said carriage includes cam follower means cooperating with said cam means so that said cam means move said carriage between said shifted positions and return it to an initial position in synchronism with the operations of the computing machine.

25. An apparatus as set forth in claim 24 wherein said cam means include two cooperating cams for advancing and retracting said carriage, respectively.

26. An apparatus as set forth in claim 25 wherein said carriage includes a spring-loaded movable support, and wherein said cam follower means is mounted on said support so as to be spring-urged into engagement with at least one of said cams.

27. An apparatus as set forth in claim 14 wherein each of said switch means includes an actuating contact spring engaged by said slides for actuating said switch means, and wherein each of said contact springs has an engaging portion extending a predetermined distance in the direction of carriage movement whereby said switch means are actuated for a predetermined time.

28. An apparatus as set forth in claim 14 wherein each of said slides includes two parts, wherein said arresting means include two parts respectively cooperating with said two parts of said slides, and wherein one part of each slide cooperates with said input bars, and the other parts of said slides are traversed by said carriage and switch means, said two parts of each slide being connected for movement with each other when the respective slide moves in said one direction.

29. An apparatus as set forth in claim 14 and comprising a set of input lines connected to said output lines for receiving coded impulses from the same; a decoding device connected to said input lines for transforming coded impulses into impulses representing digits and computing functions; relay means electrically connected to the output of said decoding device; and electromagnetic operating means for operating a computing machine and printing means and being controlled by said relay means in accordance with the sequence of successive impulses representing computing signs and computing functions so as to effect, respectively, printing of plus and minus signs, or additive and subtractive operations in the computing machine.

30. An apparatus as set forth in claim 29 wherein said second switch means of said first set of second switch means have contacts for transmitting through said output lines coded signals respectively representing plus, minus, non-addition, plus, minus, and minus wherein said second switch means of said second set have contacts for transmitting through said output lines coded signals respectively representing a spacing step, a spacing step, a spacing step, sub-total, total, sub-total and total.

31. An apparatus as set forth in claim 29 wherein said second switch means of said second set of second switch means have contacts for transmitting through said output lines coded signals respectively representing a spacing step whenever the corresponding simultaneously actuated second switch means of said first set transmit through said output lines coded signals representing an additive or subtractive operation.

32. An apparatus as set forth in claim 29 wherein said electromagnetic operating means include an electromagnetic means associated with non-addition and normally responding when an impulse representing non-addition is received by said input lines, and wherein said relay means include a first relay associated with addition and the plus sign, and a second relay associated with subtraction and the minus sign, a third relay associated with subtotals, and a fourth relay associated with totals; a circuit connecting said relays with said electromagnetic means and including relay contacts of said relays so as to actuate said last-mentioned electromagnetic means when one of said first and second relays is simultaneously energized with one of said third and fourth relays.

33. An apparatus as set forth in claim 14 and including a zero switch means located on said carriage aligned with said row of first and second switch means; and wherein each of said first slides has an elongated projection located in the path of said zero switch means for actuating the same when the respective first slide is located in the path of a first switch means associated with a digit different from zero; and circuit means connecting said zero switch means with said output circuit means for preventing an output signal representing zero before one of the first switch means associated with the digits from one to nine has been actuated in the highest order of a number.

34. An apparatus as set forth in claim 14 wherein said carriage has socket means connected to said output line; and wherein said first and second switch means have plugs connected to said contacts thereof and detachably engaging said socket means.

References Cited in the file of this patent

UNITED STATES PATENTS

| | | |
|---|---|---|
| 2,497,784 | Mehan et al. | Feb. 14, 1950 |
| 2,724,550 | Drake et al. | Nov. 22, 1955 |
| 2,744,682 | Busch et al. | May 8, 1956 |